(12) United States Patent
Alexi et al.

(10) Patent No.: US 10,175,440 B2
(45) Date of Patent: *Jan. 8, 2019

(54) MOVEABLE BEND CONTROL AND PATCH CORD SUPPORT FOR TELECOMMUNICATIONS PANEL

(71) Applicants: ADC Czech Republic, S.R.O., Brno (CZ); CommScope Connectivity Belgium BVBA, Kessel-Lo (BE)

(72) Inventors: Zoltan Alexi, Zvolen (SK); Bernardus Johannes Nicolas Geling, Ghent (BE); Simon Reyndert Christiani, Boutersem (BE); Rudi Verbruggen, Holsbeek (BE); Johan Geens, Bunsbeek (BE)

(73) Assignees: ADC Czech Republic, S.R.O. (CZ); CommScope Connectivity Belgium BVBA (BE)

( * ) Notice: Subject to any disclaimer, the term of this patent is extended or adjusted under 35 U.S.C. 154(b) by 0 days.

This patent is subject to a terminal disclaimer.

(21) Appl. No.: 15/800,845

(22) Filed: Nov. 1, 2017

(65) Prior Publication Data

US 2018/0136422 A1 May 17, 2018

Related U.S. Application Data

(63) Continuation of application No. 14/778,785, filed as application No. PCT/EP2014/055390 on Mar. 18, 2014, now Pat. No. 9,823,432.
(Continued)

(51) Int. Cl.
*G02B 6/00* (2006.01)
*H02B 1/04* (2006.01)
(Continued)

(52) U.S. Cl.
CPC .......... *G02B 6/444* (2013.01); *G02B 6/4452* (2013.01); *G02B 6/4453* (2013.01);
(Continued)

(58) Field of Classification Search
CPC .... G02B 6/444; G02B 6/4452; G02B 6/4453; G02B 6/4455; G02B 6/4471; G02B 6/4478; H04Q 1/021; H04Q 1/131
(Continued)

(56) References Cited

U.S. PATENT DOCUMENTS

| 4,708,430 A | 11/1987 | Donaldson et al. |
| 4,792,203 A | 12/1988 | Nelson et al. |

(Continued)

FOREIGN PATENT DOCUMENTS

| DE | 43 29 184 A1 | 3/1995 |
| DE | 44 13 136 C1 | 5/1995 |

(Continued)

OTHER PUBLICATIONS

ADC Telecommunications, Inc., FL2000 Products Catalog, Literature No. 803, front cover, table of contents, pp. 1-32, rear cover (Dec. 2000).
(Continued)

*Primary Examiner* — Robert Tavlykaev
(74) *Attorney, Agent, or Firm* — Merchant & Gould P.C.

(57) ABSTRACT

A termination field and a guide member are independently pivotally coupled to a base body. The termination field pivots relative to the base body along a path of travel. The guide member is coupled to the base body to provide bend radius protection to cables plugged into the termination field. The guide member defines a channel leading the cables from the termination field towards a first side of the base body at an exterior of the base body. In certain examples, the guide member and termination field pivot relative to the base (Continued)

body about different hinge axes. In other examples, the termination field pivots with the guide member for part of the path of travel and relative to the guide member for another part of the path of travel.

15 Claims, 24 Drawing Sheets

Related U.S. Application Data

(60) Provisional application No. 61/803,313, filed on Mar. 19, 2013, provisional application No. 61/913,083, filed on Dec. 6, 2013.

(51) Int. Cl.
  *G02B 6/44* (2006.01)
  *H04Q 1/02* (2006.01)
  *H04Q 1/06* (2006.01)

(52) U.S. Cl.
  CPC ......... *G02B 6/4455* (2013.01); *G02B 6/4471* (2013.01); *G02B 6/4478* (2013.01); *H04Q 1/021* (2013.01); *H04Q 1/131* (2013.01); *H04Q 1/02* (2013.01); *H04Q 1/06* (2013.01); *H04Q 1/13* (2013.01)

(58) Field of Classification Search
  USPC .................... 385/134–137; 361/610, 724
  See application file for complete search history.

(56) References Cited

U.S. PATENT DOCUMENTS

| | | | |
|---|---|---|---|
| 4,912,615 A | 3/1990 | Bluband | |
| 4,995,681 A | 2/1991 | Parnell | |
| 5,142,606 A | 8/1992 | Carney et al. | |
| 5,266,272 A | 11/1993 | Griner et al. | |
| 5,339,379 A | 8/1994 | Kutsch et al. | |
| 5,402,515 A | 3/1995 | Vidacovich et al. | |
| 5,497,444 A | 3/1996 | Wheeler | |
| 5,584,396 A | 12/1996 | Schmitt | |
| 5,717,810 A | 2/1998 | Wheeler | |
| 5,730,400 A | 3/1998 | Rinderer | |
| 5,740,299 A | 4/1998 | Llewellyn et al. | |
| 5,758,003 A | 5/1998 | Wheeler et al. | |
| 5,778,131 A | 7/1998 | Llewellyn et al. | |
| 5,870,519 A | 2/1999 | Jenkins et al. | |
| 5,946,440 A | 8/1999 | Puetz | |
| 5,966,492 A | 10/1999 | Bechamps et al. | |
| 6,160,946 A | 12/2000 | Thompson et al. | |
| 6,234,240 B1 | 5/2001 | Cheon | |
| 6,263,141 B1 | 7/2001 | Smith | |
| 6,272,009 B1 | 8/2001 | Buican et al. | |
| 6,301,424 B1 | 10/2001 | Hwang | |
| 6,326,547 B1* | 12/2001 | Saxby ................. H02G 11/00 174/69 |
| 6,418,264 B1 | 7/2002 | Hough et al. | |
| 6,427,045 B1 | 7/2002 | Matthes | |
| 6,438,310 B1 | 8/2002 | Lance et al. | |
| 6,442,022 B1 | 8/2002 | Paul | |
| 6,529,373 B1 | 3/2003 | Liao et al. | |
| 6,538,879 B2 | 3/2003 | Jiang | |
| 6,540,083 B2 | 4/2003 | Shih | |
| 6,556,763 B1 | 4/2003 | Puetz et al. | |
| 6,560,099 B1 | 5/2003 | Chang | |
| 6,591,051 B2 | 7/2003 | Solheid et al. | |
| 6,600,665 B2 | 7/2003 | Lauchner | |
| 6,631,237 B2 | 10/2003 | Knudsen et al. | |
| RE38,311 E | 11/2003 | Wheeler | |
| 6,738,261 B2 | 5/2004 | Vier et al. | |
| 6,760,531 B1* | 7/2004 | Solheid ................. G02B 6/4452 385/135 |
| 6,788,544 B1 | 9/2004 | Barsun et al. | |
| 6,788,786 B1 | 9/2004 | Kessler et al. | |
| 6,810,194 B2 | 10/2004 | Griffiths et al. | |
| 6,850,685 B2 | 2/2005 | Tinucci et al. | |
| 6,870,734 B2 | 3/2005 | Mertesdorf et al. | |
| 6,902,069 B2 | 6/2005 | Hartman et al. | |
| 6,925,241 B2 | 8/2005 | Bohle et al. | |
| 6,944,383 B1 | 9/2005 | Herzog et al. | |
| 6,944,387 B2 | 9/2005 | Howell et al. | |
| 7,070,459 B2* | 7/2006 | Denovich ............. G02B 6/4452 385/134 |
| 7,079,744 B2 | 7/2006 | Douglas et al. | |
| 7,086,539 B2 | 8/2006 | Knudsen et al. | |
| 7,090,084 B2 | 8/2006 | Knudsen et al. | |
| 7,102,884 B2 | 9/2006 | Mertesdorf et al. | |
| 7,142,765 B2 | 11/2006 | Rapp et al. | |
| 7,302,154 B2 | 11/2007 | Trebesch et al. | |
| 7,349,615 B2 | 3/2008 | Frazier et al. | |
| 7,408,769 B2 | 8/2008 | Mertesdorf et al. | |
| 7,460,758 B2 | 12/2008 | Xin | |
| 7,473,846 B2* | 1/2009 | Doerr ................. H05K 7/1491 174/68.3 |
| 7,478,730 B2 | 1/2009 | Knudsen et al. | |
| 7,527,226 B2 | 5/2009 | Kusuda et al. | |
| 7,856,166 B2 | 12/2010 | Biribuze et al. | |
| 8,002,123 B2 | 8/2011 | Knudsen et al. | |
| 8,019,191 B2 | 9/2011 | Laurisch | |
| 8,144,457 B2 | 3/2012 | Mertesdorf et al. | |
| 8,315,498 B2 | 11/2012 | Redmann et al. | |
| 8,331,752 B2 | 12/2012 | Biribuze et al. | |
| 8,417,074 B2 | 4/2013 | Nhep et al. | |
| 8,879,881 B2 | 11/2014 | Cote et al. | |
| 8,991,623 B2 | 3/2015 | Knudsen et al. | |
| 9,081,164 B2 | 7/2015 | Badar et al. | |
| 9,128,262 B2 | 9/2015 | Campbell et al. | |
| 9,494,759 B2 | 11/2016 | Claessens et al. | |
| 9,529,171 B2 | 12/2016 | Knudsen et al. | |
| 9,664,870 B2 | 5/2017 | Trebesch et al. | |
| 9,715,075 B2 | 7/2017 | Solheid et al. | |
| 9,823,432 B2 | 11/2017 | Alexi et al. | |
| 2002/0125800 A1 | 9/2002 | Knudsen et al. | |
| 2002/0159745 A1 | 10/2002 | Howell et al. | |
| 2002/0170726 A1* | 11/2002 | Mendoza ............... H04Q 1/064 174/15.2 |
| 2002/0179485 A1 | 12/2002 | Shih | |
| 2002/0191942 A1 | 12/2002 | Griffiths et al. | |
| 2003/0086675 A1 | 5/2003 | Wu et al. | |
| 2004/0074852 A1 | 4/2004 | Knudsen et al. | |
| 2004/0079711 A1 | 4/2004 | Hartman et al. | |
| 2004/0251220 A1 | 12/2004 | Mertesdorf et al. | |
| 2006/0118497 A1 | 6/2006 | Knudsen et al. | |
| 2006/0275008 A1 | 12/2006 | Xin | |
| 2007/0127201 A1 | 6/2007 | Mertesdorf et al. | |
| 2007/0230889 A1 | 10/2007 | Sato et al. | |
| 2008/0152416 A1 | 7/2008 | Heaton et al. | |
| 2009/0129045 A1 | 5/2009 | Mertesdorf et al. | |
| 2009/0257726 A1 | 10/2009 | Redmann et al. | |
| 2009/0270832 A1 | 10/2009 | Vancaillie et al. | |
| 2010/0012599 A1 | 1/2010 | Knudsen et al. | |
| 2010/0054681 A1 | 3/2010 | Biribuze et al. | |
| 2011/0085776 A1 | 4/2011 | Biribuze et al. | |
| 2011/0297629 A1 | 12/2011 | Knudsen et al. | |
| 2013/0170810 A1 | 7/2013 | Badar et al. | |
| 2013/0322839 A1 | 12/2013 | Claessens et al. | |
| 2014/0248028 A1 | 9/2014 | Campbell et al. | |
| 2014/0376870 A1 | 12/2014 | Takeuchi et al. | |
| 2015/0234142 A1 | 8/2015 | Courchaine et al. | |
| 2016/0124160 A1 | 5/2016 | Verheyden et al. | |
| 2017/0227728 A1 | 8/2017 | Claessens et al. | |
| 2017/0235077 A1 | 8/2017 | Knudsen et al. | |
| 2017/0276892 A1 | 9/2017 | Geling et al. | |
| 2017/0276893 A1 | 9/2017 | Geling et al. | |
| 2017/0293099 A1 | 10/2017 | Alexi et al. | |

FOREIGN PATENT DOCUMENTS

| | | |
|---|---|---|
| EP | 0 215 668 A2 | 3/1987 |
| EP | 0 293 183 A2 | 11/1988 |
| EP | 0 594 913 A1 | 5/1994 |
| EP | 1 203 974 A2 | 5/2002 |

(56) References Cited

FOREIGN PATENT DOCUMENTS

| EP | 2 159 617 A2 | 3/2010 |
|---|---|---|
| EP | 2 772 780 A1 | 9/2014 |
| EP | 2 775 334 A1 | 9/2014 |
| FR | 2 959 383 A1 | 10/2011 |
| WO | WO 02/19005 A2 | 3/2002 |
| WO | WO 02/21182 A1 | 3/2002 |
| WO | WO 02/071767 A2 | 9/2002 |
| WO | WO 2008/149131 A2 | 12/2008 |
| WO | WO 2011/100613 A1 | 8/2011 |

OTHER PUBLICATIONS

ADC Telecommunications, Inc., Next Generation Frame Product Family Ordering Guide, Literature No. 820, front cover, table of contents, pp. 1-43, rear cover (Apr. 2002).
International Search Report and Written Opinion for International Application No. PCT/EP2014/055390 dated Oct. 10, 2014.

* cited by examiner

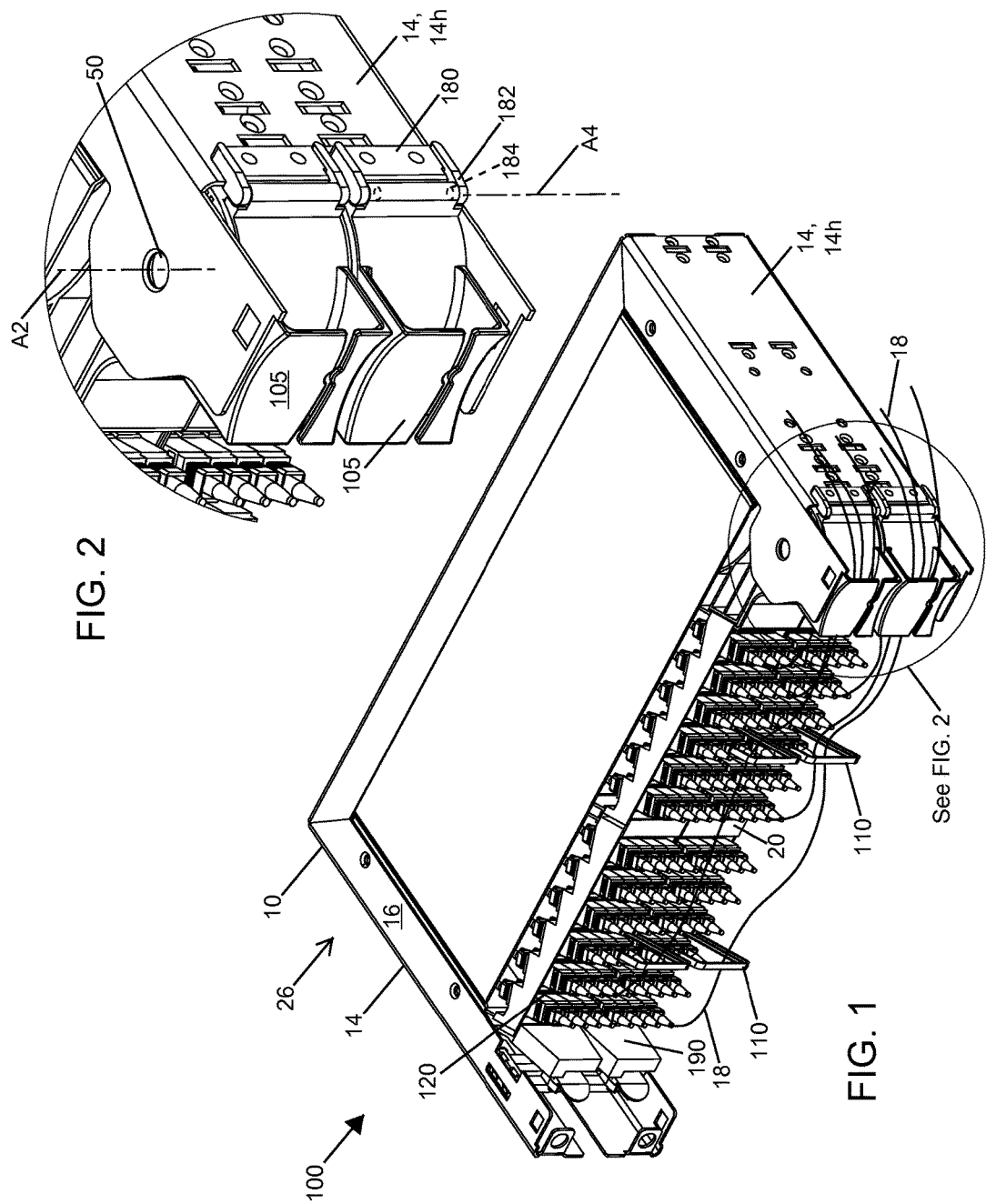

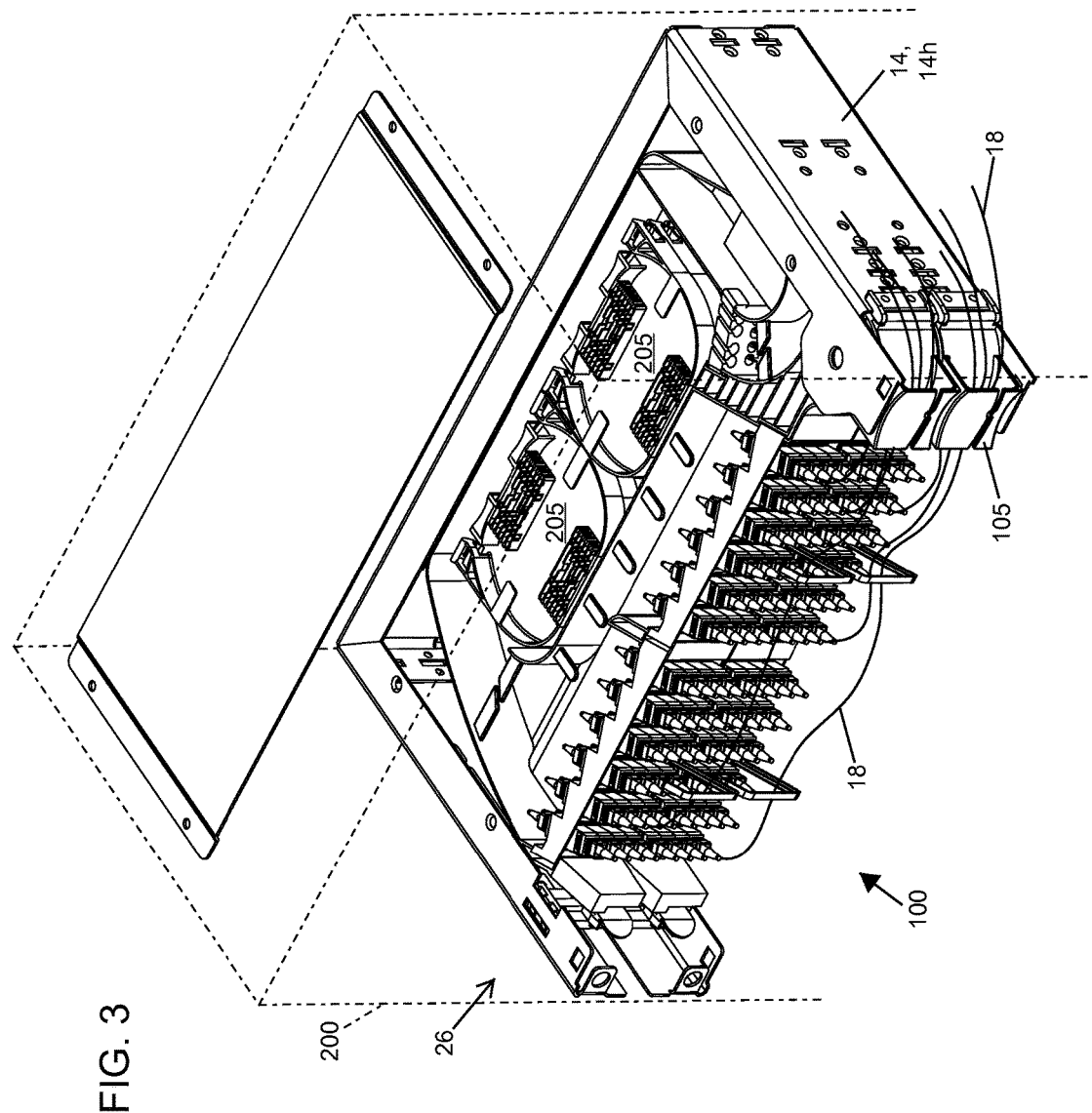

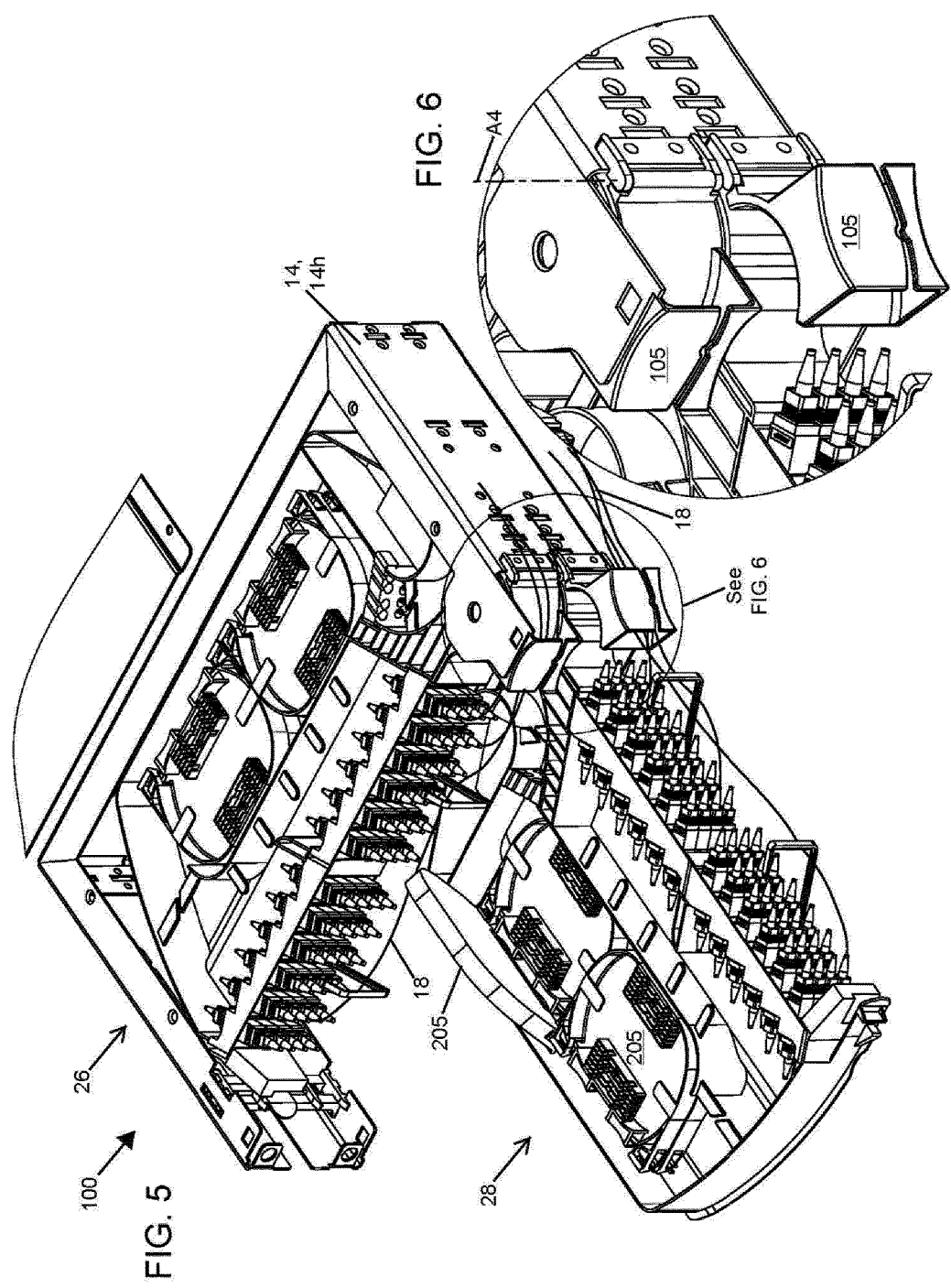

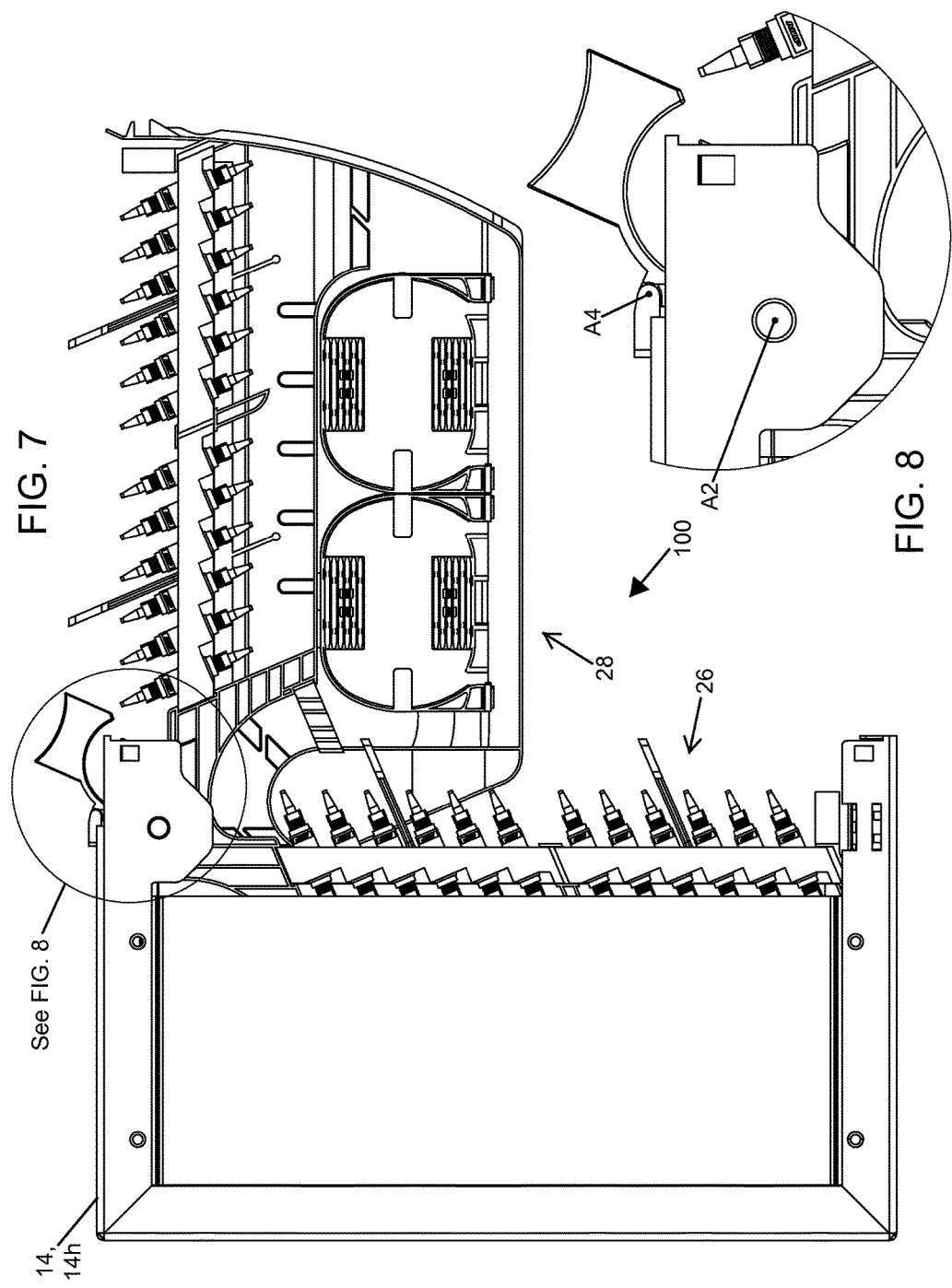

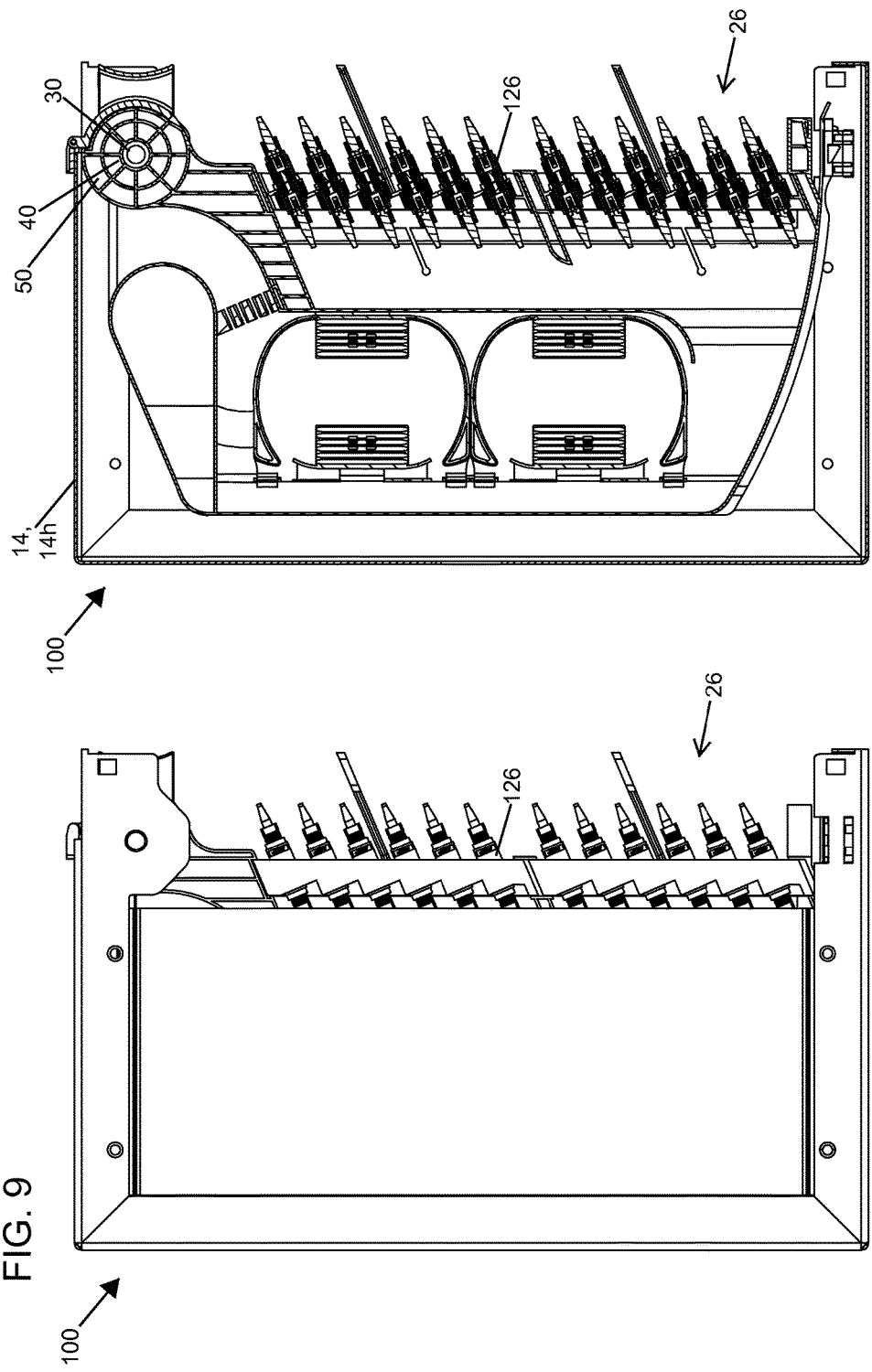

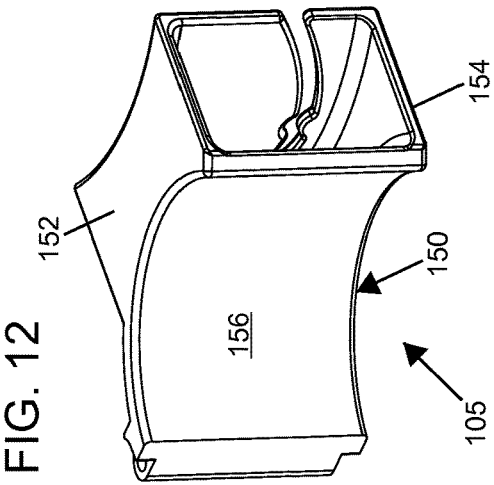
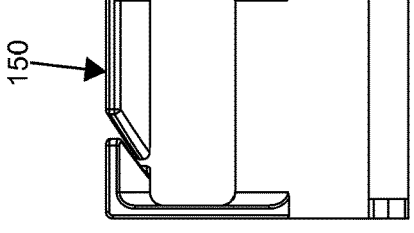
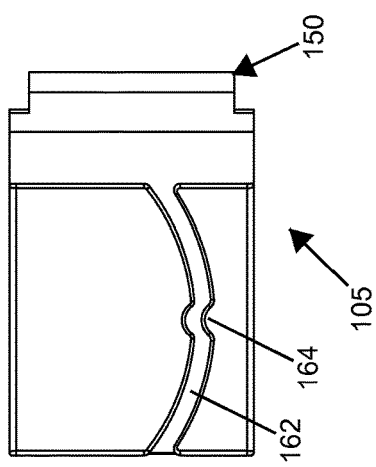
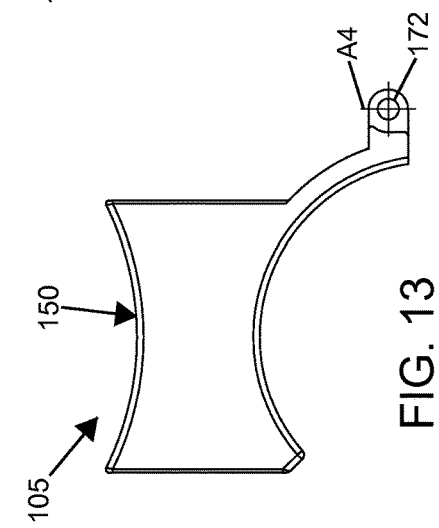
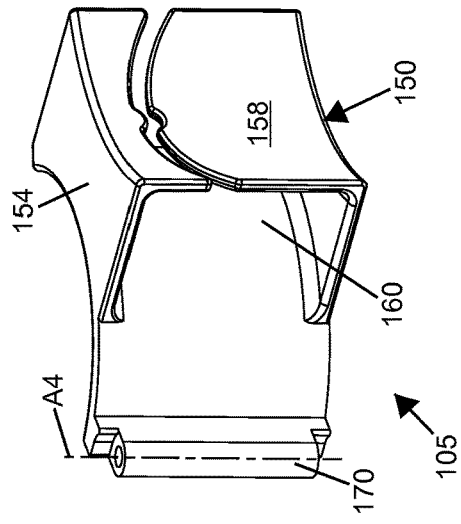
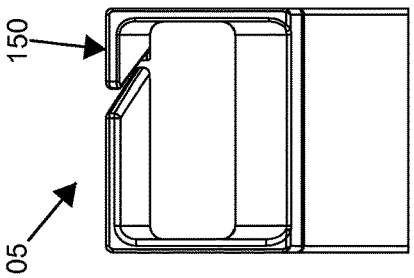

MOVEABLE BEND CONTROL AND PATCH CORD SUPPORT FOR TELECOMMUNICATIONS PANEL

CROSS-REFERENCE TO RELATED APPLICATION(S)

This application is a Continuation of U.S. patent application Ser. No. 14/778,785 filed on 21 Sep. 2015, which is a National Stage of PCT/EP2014/055390, filed on 18 Mar. 2014 and claims benefit of U.S. Patent Application Ser. No. 61/803,313 filed on 19 Mar. 2013 and U.S. Patent Application Ser. No. 61/913,083 filed on 6 Dec. 2013, and which applications are incorporated herein by reference. To the extent appropriate, a claim of priority is made to each of the above disclosed applications.

TECHNICAL FIELD

The present invention relates to telecommunications panels and cable bend control guides, patch cord supports, and hinges adapted to be used in various telecommunications panels.

BACKGROUND

Numerous telecommunications panels exist today and are used in various equipment applications. Conventional telecommunications panels include hinges that are designed to allow a tray to be rotated out of the telecommunications panel. By rotating the tray out of the telecommunications panel, access is provided to rear portions of a termination field. Such trays may include cable management structures that aid in organizing and managing telecommunications cables routed to and away from the telecommunications panel.

SUMMARY

In this disclosure, a telecommunications arrangement includes a base body, a termination field pivotally coupled to the base body, and a guide member coupled to the base body independent of the termination field. The base body defines an interior accessible through an open front that extends between a first side and a second side. The termination field couples to the base body to pivot relative to the base body along a path of travel between a first position and a second position. The termination field extends across the open front when in the first position provides access to the open front when in the second position. The guide member is coupled to the base body to provide bend radius protection to cables plugged into the termination field. The guide member is configured to pivot relative to the base body and to pivot relative to the termination field. The guide member defines a channel leading the cables from the termination field towards the first side of the base body at an exterior of the base body.

In certain examples, the guide member does not extend across any optical adapters of the termination field. In certain examples, the guide member is coupled to the base body at a front corner of the base body. In certain examples, the termination field includes at least one row of optical adapters. In examples, the termination field includes multiple rows of optical adapters. In certain examples, the guide member defines a single channel. In other examples, the guide member defines multiple channels.

In some implementations, the termination field pivots about a first axis and the guide member pivots about a second axis that is spaced from the first axis. In other implementations, the termination field and the guide member pivot about a common axis.

In some implementations, the termination field is configured to pivot with the guide member relative to the base body as the termination field pivots along a first portion of the path of travel; and to pivot relative to the guide member as the termination field pivots along a second portion of the path of travel. In other implementations, the guide member pivots relative to the termination field to compensate for changes in a route length along which the optical cables extend.

In some implementations, a base body holds one termination field and one guide member. In other implementations, a base body can hold a plurality of termination fields and a plurality of guide members.

In an example, the base body includes an enclosure body and the termination field is carried by a door that opens and shuts the enclosure body. In another example, the base body includes a chassis and the termination field is carried by a tray that pivots into and out of the chassis.

In some implementations, a telecommunications panel includes a chassis, a tray rotatably mounted to the chassis by a hinge, and a guide member rotatably mounted to the chassis. The tray is moveable in and out of the chassis. The guide member is adapted to provide bend radius protection to cables routed to the telecommunications panel.

In other implementations, a telecommunications panel includes a chassis, a pin mounted to the chassis, and a tray rotatably mounted to the chassis by a hinge. The tray is moveable in and out of the chassis. The hinge includes a sleeve of the tray mounted about the pin. The sleeve is removable from the pin without removing the pin from the chassis. The tray is removable from the chassis by removing the sleeve from the pin.

In other implementations, a method of using a telecommunication panel includes: 1) providing the telecommunication panel with a chassis, a tray, a hinge, and a guide member; 2) moving the tray between an installed configuration and an access configuration by rotating the hinge; 3) rotating the guide member while moving the tray; and 4) providing bend radius protection to cables routed to the telecommunications panel with the rotating guide member.

In other implementations, an enclosure defines an access opening for accessing an interior of the enclosure. A door and guide members are pivotally mounted to the enclosure at the access opening. The door pivots along a path of travel to at least partially close the access opening when in a closed position and to allow access to the enclosure interior through the access opening when in an open position. The guide members move with the door relative to the enclosure when the door moves along a first portion of the path of travel. The guide members stop moving relative to the enclosure at an intermediate position along the path of travel. The door is configured to move relative to the guide members and the enclosure as the door moves along a second portion of the path of travel.

In certain examples, the door is configured to hold one or more optical adapters. In other examples, the door is configured to hold value-added modules (VAMs) that include optical adapters. In still other examples, the door is configured to hold electrical jacks.

A variety of additional inventive aspects will be set forth in the description that follows. The inventive aspects can relate to individual features and to combinations of features.

It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 1 is a perspective view of an example telecommunications panel including a cable guide member providing moveable bend control and patch cord support according to the principles of the present disclosure;

FIG. 2 is an enlarged portion of FIG. 1;

FIG. 3 is the perspective view of FIG. 1, but with a cover of the telecommunications panel removed;

FIG. 5 is the perspective view of FIG. 4, but with a cable management structure of the tray rotated upward;

FIG. 6 is an enlarged portion of FIG. 5;

FIG. 7 is a top plan view of the telecommunications panel of FIG. 1 with the tray of FIG. 4 rotated out of the interior;

FIG. 8 is an enlarged portion of FIG. 7;

FIG. 9 is the top plan view of FIG. 7, but with the tray of FIG. 4 rotated into the interior;

FIG. 10 is the top plan view of FIG. 9, but with a cut-away revealing the interior of the telecommunications panel;

FIG. 11 is a perspective view of the cable guide member of FIG. 1;

FIG. 12 is another perspective view of the cable guide member of FIG. 1;

FIG. 13 is a bottom plan view of the cable guide member of FIG. 1;

FIG. 14 is a front elevation view of the cable guide member of FIG. 1;

FIG. 15 is a first side elevation view of the cable guide member of FIG. 1;

FIG. 16 is a second side elevation view of the cable guide member of FIG. 1;

DETAILED DESCRIPTION

Figure 4:
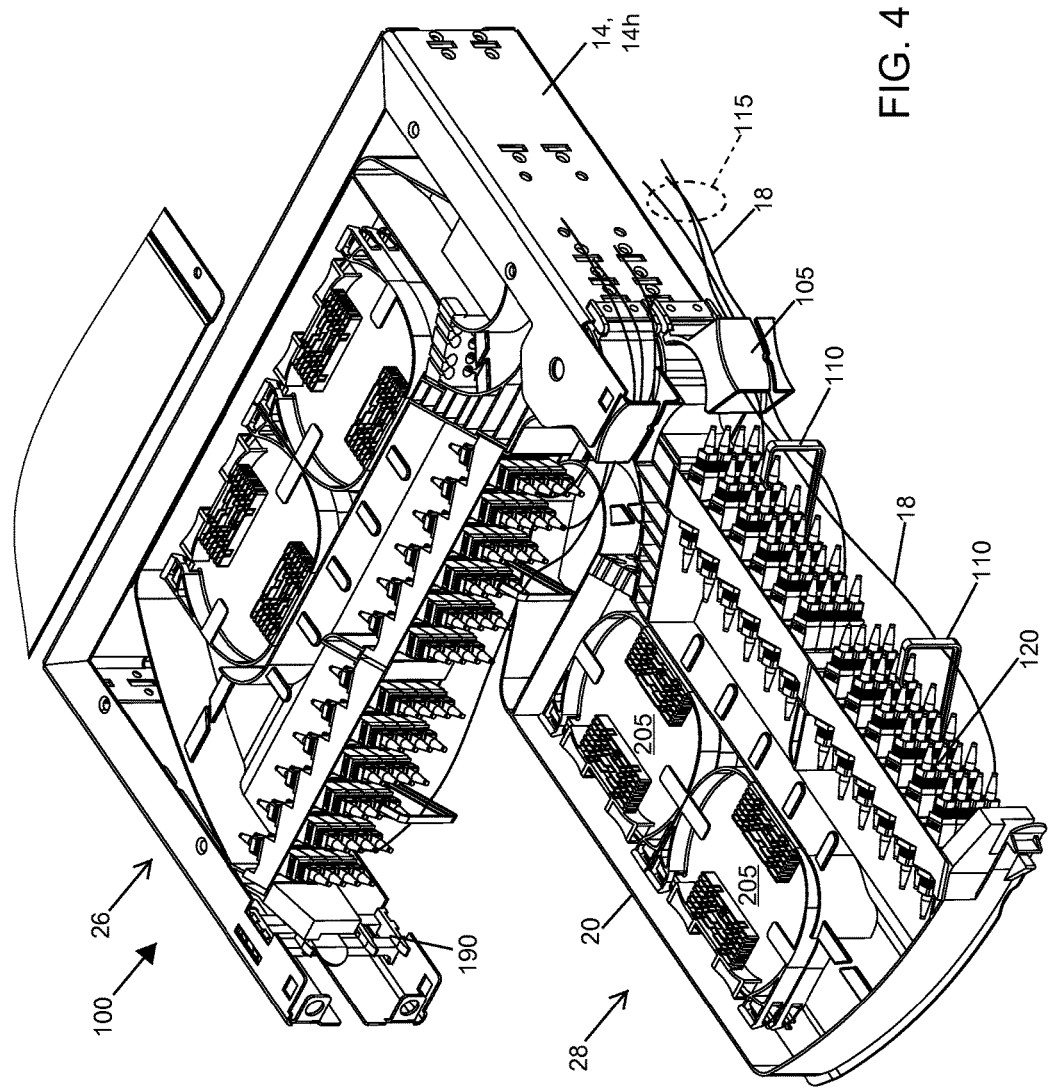
FIG. 4 is a portion of the perspective view of FIG. 3, but with a tray rotated out of an interior of the telecommunications panel.

Reference will now be made in detail to exemplary aspects of the present disclosure that are illustrated in the accompanying drawings. Whenever possible, the same reference numbers will be used throughout the drawings to refer to the same or similar parts.

In this disclosure, a telecommunications arrangement includes a base body, a termination field pivotally coupled to the base body, and a guide member coupled to the base body independent of the termination field. The base body defines an interior accessible through an open front. The termination field couples to the base body to pivot relative to the base body along a path of travel between a first position and a second position. The termination field extends across the open front when in the first position provides access to the open front when in the second position. The guide member is coupled to the base body to provide bend radius protection to cables plugged into the termination field. The guide member is configured to pivot relative to the base body and to pivot relative to the termination field. The guide member defines a channel leading the cables from the termination field to an exterior of the base body.

In some implementations, the open front extends between a first side and a second side of the base body; and the channel of the guide member routes the cables towards the first side of the base body.

FIGS. 1-33 illustrate example telecommunications arrangements. In some implementations, the termination field of the telecommunications arrangement can be carried by a tray that pivots into and out of a base body (e.g., see FIGS. 1-23). In other implementations, the termination field of the telecommunications arrangement can be carried by a door that opens and closes a base body (e.g., see FIGS. 24-33). In still other implementations, the termination field of the telecommunications arrangement can be otherwise carried by another pivotal member that mounts to a base body.

FIGS. 1-23 illustrate an example telecommunications arrangement including a telecommunications panel 100 (e.g., an enclosure, an optical distribution frame, etc.) configured according to the principles of the present disclosure. As illustrated at FIG. 3, the telecommunications panel 100 may be included in a cabinet 200. The telecommunications panel 100 and/or the cabinet 200 may be used for various purposes in telecommunications systems. For example, patch cords 18 (i.e., patch cables, connectorized fiber optic cables, etc.) may enter the telecommunications panel 100 and/or the cabinet 200 and be interconnected at a termination field 120. The termination field 120 may include a plurality of fiber optic adapters 126. Fiber optic connectors that terminate ends of the patch cords 18 may connect with the fiber optic adapters 126 of the termination field 120. The interconnections at the termination field 120 may be rearranged from time-to-time, as desired, for changing configurations of the telecommunications system. The telecommunications panel 100 may further hold splitters, filters, and various other telecommunications components.

Figure 17:
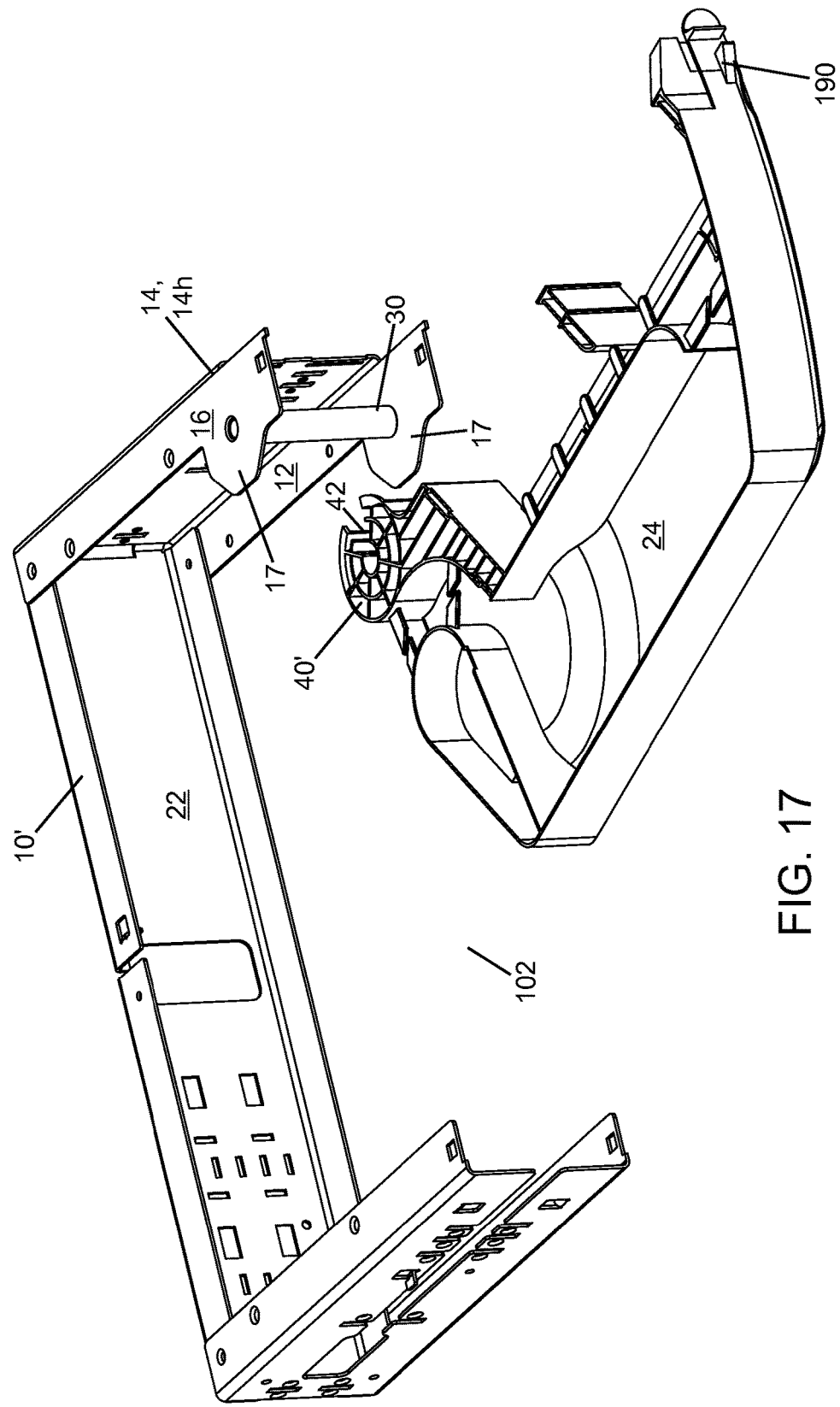
FIG. 17 is a perspective view of a chassis suitable for use with the telecommunications panel of FIG. 1 with a tray structure of a tray suitable for use with the telecommunications panel of FIG. 1 positioned to be snapped over a mounting pin of the chassis.
Figure 21:
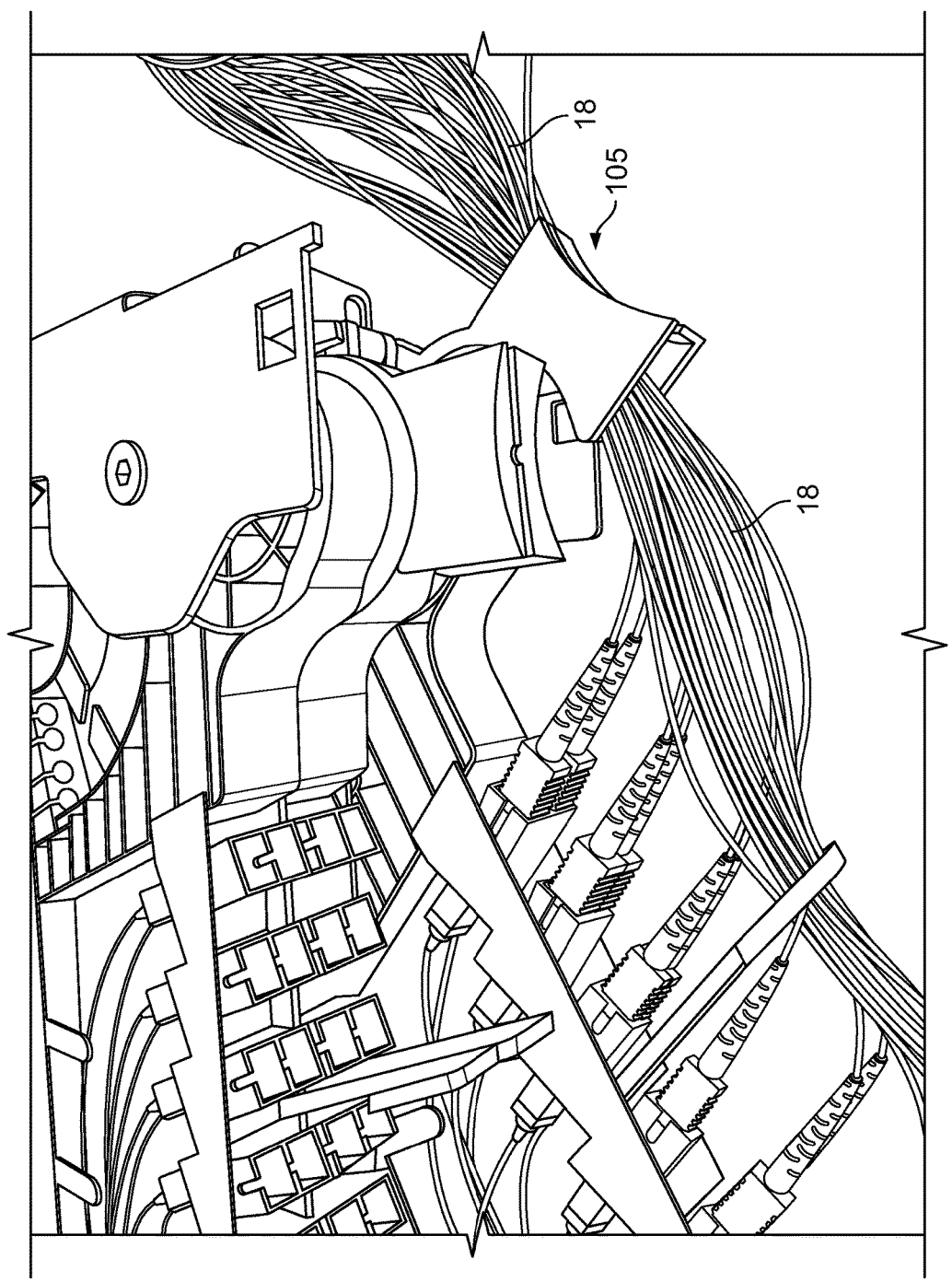
FIG. 21 is another partial perspective view of the telecommunications panel of FIG. 20, but with one of the rotatable cable guide members rotated and a tray rotated partially out of an interior of the telecommunications panel.
Figure 22:
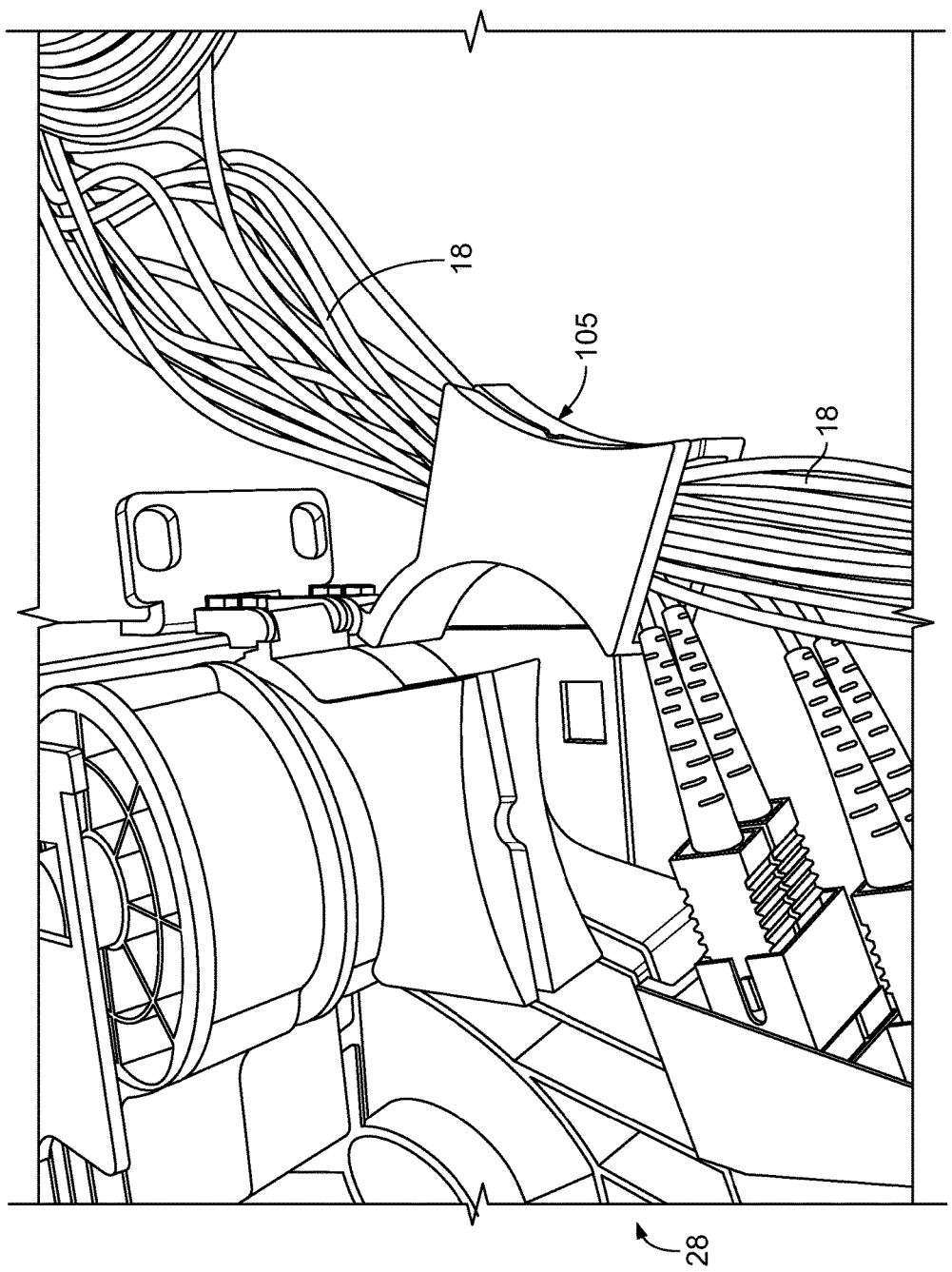
FIG. 22 is still another partial perspective view of the telecommunications panel of FIG. 20, but with the one of the rotatable cable guide members of FIG. 21 further rotated and with the tray of FIG. 21 rotated out of the interior of the telecommunications panel.
Figure 23:
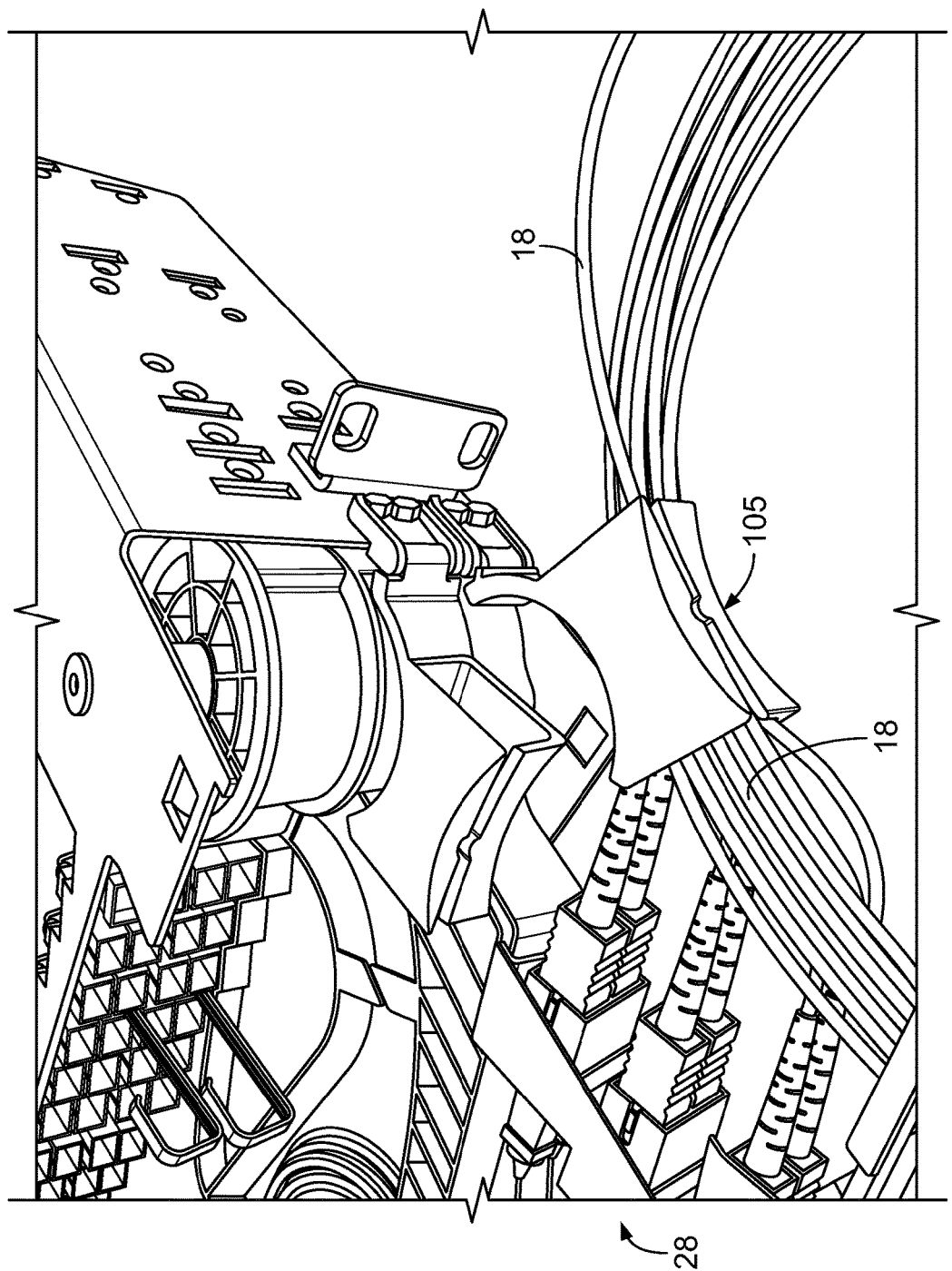
FIG. 23 is yet another partial perspective view of the telecommunications panel of FIG. 20 with the one of the rotatable cable guide members of FIG. 21 further rotated and with the tray of FIG. 21 rotated out of the interior of the telecommunications panel, as in FIG. 22.

The telecommunications panel 100 may include a chassis 10, a tray 20 (e.g., a sub-rack), and a hinge 50. The hinge 50 includes a pin 30 and a sleeve 40 that are arranged and configured to couple to one another (see FIG. 10). As depicted, the hinge 50 connects the tray 20 to the chassis 10 and defines a vertical hinge with an axis A2 for the telecommunications panel 100. As depicted, the tray 20 includes the sleeve 40 and the tray 20 rotates with the sleeve 40 about the axis A2 thereby creating a pivot. As illustrated at FIGS. 17 and 21, the pin 30 may be mounted to the chassis 10 with suitable fasteners. The chassis 10 may include a base 12 and a top 16 that each include mounting tabs 17 with attachment points (e.g., fastener holes) for attaching the pin 30 (see FIG. 17). The tray 20 and, in particular, the sleeve 40 may be trapped between the mounting tabs 17 of the top 16 and the base 12 of the chassis 10. As depicted, in certain embodiments multiple trays 20 may be stacked upon one another and mounted about the pin 30. The trays 20 may be independently rotatable about the axis A2 and may be rotated separately or together about the pin 30.

As depicted at FIG. 1, the chassis 10 extends between opposing sides 14. The hinge 50 is mounted adjacent a hinge side 14h of the opposing sides 14. The patch cords 18 extend from the termination field 120 and are routed adjacent the hinge side 14h and/or through the cabinet 200. When the tray 20 is rotated between an installed configuration 26 (see FIGS. 1, 3, 9, and 10) and an access configuration 28 (see FIGS. 4-8) the patch cords 18 are guided by a guide member 105. As depicted, a plurality of the guide members 105 is illustrated with each of the guide members 105 corresponding to one of the trays 20. The guide members 105 are rotatable about an axis A4 (see FIG. 2). The axis A4 is spaced away from the axis A2 in the depicted embodiments. In other embodiments, the axis A2 and A4 may be colinear with each other.

The guide members 105 are rotatable guide members that serve to guide the patch cords 18 when the tray 20 is moved between the installed configuration 26 and the access configuration 28. The guide members 105 further support the patch cords 18 when the tray 20 is at the installed configuration 26, the access configuration 28, and between the installed configuration 26 and the access configuration 28. As depicted, the guide members 105 guide the patch cords 18 that are routed to the termination field 120 of the tray 20 that corresponds to the guide member 105. As one of the trays 20 is rotated between the installed configuration 26 and the access configuration 28, only the guide member 105 that corresponds with the one of the trays 20 need rotate about the axis A4. Other of the guide members 105 corresponding to the trays 20 that remain stationary may also remain stationary.

The guide members 105 may cooperate with corresponding guide members 110 that are mounted to and move with the tray 20. As depicted, the tray 20 includes two of the guide members 110 that generally move with the tray 20 as it is moved between the installed configuration 26 and the access configuration 28. Some of the patch cords 18 are routed through two of the guide members 110. Others of the patch cords 18 are routed through one of the guide members 110. Still others of the patch cords 18 are not routed through the guide members 110. In particular, terminal locations on the termination field 120 farther from the axis A2 may have a corresponding one of the patch cords 18 routed through multiple guide members 110. Terminal locations on the termination field 120 nearer to the axis A2 may have a corresponding one of the patch cords 18 directly routed to the guide members 105.

Guide members 115 adjacent the hinge side 14h of the telecommunications panel 100 and/or the cabinet 200 may further cooperate with the guide members 105. As illustrated at FIG. 4, one of the guide members 115 is positioned at the hinge side 14h of the telecommunications panel 100 and cooperates with the guide member 105. The guide members 115 may be mounted to the telecommunications panel 100 (e.g., the chassis 10) and/or the cabinet 200. The guide members 115 may remain stationary with the telecommunications panel 100 (e.g., the chassis 10).

The guide members 105, 110, and 115 thereby may form a guide member system wherein a first portion of the patch cords 18 are guided and held relative to the tray 20, a second portion of the patch cords 18 are held and guided relative to the chassis 10, and a third portion, between the first portion and the second portion, is held and guided by the independently rotatable guide member 105.

Some or all of the patch cords 18 may slide along their length within the guide members 105, 110, and/or 115 as the tray 20 is moved between the installed configuration 26 and the access configuration 28.

As the tray 20 is rotated between the installed configuration 26 and the access configuration 28, a route length of the patch cords 18 may change. In particular, the patch cords 18 may generally arc around the axis A2 when transitioning from the termination field 120 to the hinge side 14h of the telecommunications panel 100. As a portion of the patch cords 18 arcing around the axis A2 may extend over a greater angle when the tray 20 is at the installed configuration 26 in comparison to the access configuration 28, a greater route length would occur when the tray 20 is at the installed configuration 26. As the tray 20 is rotated toward the access configuration 28, a resulting reduced route length of the patch cords 18 may lead to a bunching of the patch cords 18. The bunching of the patch cords 18 may further lead to buckling of the patch cords 18 and/or otherwise may lead to the patch cords 18 bending sharper than a minimum bend radius of optical fiber within the patch cords 18 specifies.

However, according to the principles of the present disclosure, a position of the axis A4 is selected such that the guide member 105 swings away from the axis A2 and thereby compensates for the otherwise changing route length by adding to the route length when rotated away from the axis A2 and reducing the route length when rotated toward the axis A2. In particular, the guide members 105 are positioned nearer to the axis A2 when the tray 20 is at the installed configuration 26 and rotate away from the axis A2 as the tray 20 is moved toward the access configuration 28. Compensating changes in the route length are thereby reduced and increased by the action of the guide members 105 as they rotate about the axis A4. Overall differences in the route length between the installed configuration 26 and the access configuration 28 may thereby be reduced and/or eliminated.

In the depicted embodiments, the guide members 105 freely rotate about the axis A4 but are urged to a rotational position by the patch cords 18 that are routed through the guide members 105. In particular, an equilibrium position is determined by differential bending of the patch cords 18. The patch cords 18 generally require a greater bending moment to reach a sharper bending radius and a lesser bending moment to reach a gentler bending radius. By routing the patch cords 18 through the guide members 105, and by having the guide members 105 rotatable about the axis A4 that is offset from the axis A2, the guide members 105 are rotationally positioned about the axis A4 at a rotational position that minimizes or at least reduces the bending moments carried by the patch cords 18. By minimizing or at least reducing the bending moments carried by the patch cords 18, the bend radii of the patch cords 18 are maximized or at least enlarged. Bend radius protection is thereby provided by the guide members 105 to the patch cords 18.

In certain embodiments, some or all of the patch cords 18 may slide along their length within the guide members 105, 110, and/or 115. The equilibrium position and/or the bend radius protection may be affected by such sliding. Such sliding may further minimize or at least reduce the bending moments carried by the patch cords 18, and the bend radii of the patch cords 18 may thereby be maximized or at least enlarged. Additional bend radius protection may thereby be provided by the guide members 105, 110, and/or 115 to the patch cords 18.

In addition to bend radius protection, the guide members 105, 110, and/or 115 may prevent the patch cords 18 from tangling and/or mixing with other patch cords 18. Tangling and/or mixing may be prevented between the patch cords 18 corresponding to the same tray 20 and/or between the patch cords 18 of neighboring trays 20.

Turning now to FIGS. 11-16, the guide member 105 will be described in detail. The guide member 105 includes a guide member body 150 that extends between a first side 152 and a second side 154. In the depicted embodiment, the first side 152 corresponds to a top of the guide member 105, and the second side 154 corresponds to a bottom of the guide member 105. The guide member body 150 further includes an inner wall 156 and an outer wall 158. As depicted, the inner wall 156 and the outer wall 158 are formed in a partially cylindrical shape. The partially cylindrical shape of the inner wall 156 may be concentric with the axis A2 when the guide member 105 is positioned at the installed configuration 26 (see FIG. 2). The inner wall 156 may also be concentric with the sleeve 40 and/or the pin 30 when the guide member 105 is at the installed configuration 26.

As illustrated at FIGS. 4, 5, and 20-23, the inner wall 156 and the outer wall 158 facilitate a tangential transitioning of the patch cords 18 from the termination field 120 as the patch cords 18 pass through a cable passage 160 of the guide member body 150. As depicted, the cable passage 160 is formed by the first side 152, the second side 154, the inner wall 156, and the outer wall 158. To install and remove the patch cords 18 from the cable passage 160, a cable insertion slot 162 is provided. The guide member body 150 further includes a hinge portion 170. The hinge portion 170 defines the axis A4 and is adapted to mount to the chassis 10 of the telecommunications panel 100. In the depicted embodiment, the hinge portion 170 includes a pin hole 172.

As depicted, the cable insertion slot 162 is positioned at the outer wall 158. The cable insertion slot 162 may be curved along an arc. The patch cord 18 may be curved about a similar arc to facilitate passage into and through the cable insertion slot 162. As the direction of bending the patch cord 18 for insertion through the cable insertion slot 162 is generally perpendicular to the bending of the patch cords 18 around the axis A2, the patch cords 18 are retained within the cable passage 160 and are unlikely to accidentally pass through the cable insertion slot 162. To further keep the patch cords 18 installed within the cable passage 160, a keeper 164 is provided along the cable insertion slot 162. The keeper 164 may allow the cable insertion slot 162 to be widened and still provide a restrictive path for the patch cord 18 to be installed into and removed from the cable passage 160.

Turning now to FIG. 2, mounts 180 of the telecommunications panel 100 are illustrated. The mounts 180 are adapted to mount the guide member 105 to the chassis 10. As depicted, the mount 180 includes a pair of arms 182. The pair of arms 182 may each include a pin stub 184. The pin stubs 184 of the pair of arms 182 may face inwardly toward each other. The arms 182 may be flexible and thereby facilitate the insertion of the guide member 105 between the arms 182 by bending the arms 182 outwardly from each other. The pin stubs 184 may further include ramp surfaces which further facilitate the spreading of the arms 182 when the hinge portion 170 of the guide member body 150 is pressed through between the pin stubs 184 and the arms 182. Upon the hinge portion 170 being in position, the pin hole 172 aligns with the pin stubs 184, and the pin stubs 184 insert themselves into the pin hole 172. In particular, the arms 182 urge the pin stubs 184 into the pin hole 172. Upon the guide member 105 being inserted into the mount 180, the guide member 105 is freely rotatable about the axis A4. Removal of the guide member 105 may be accomplished by spreading the arms 182 and reversing the above process.

Figure 18:
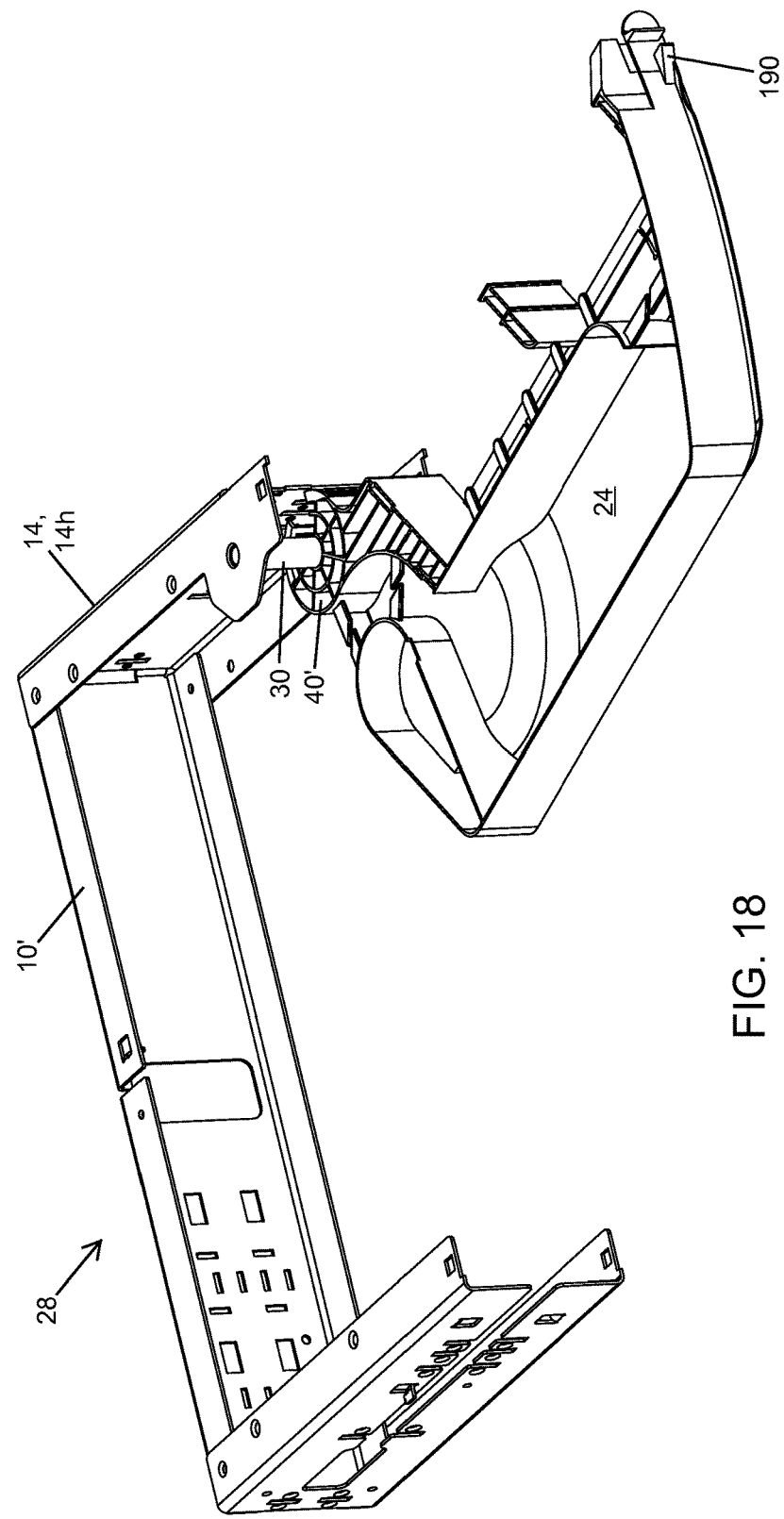
FIG. 18 is the perspective view of FIG. 17, but with the tray structure snapped over the pin.
Figure 19:
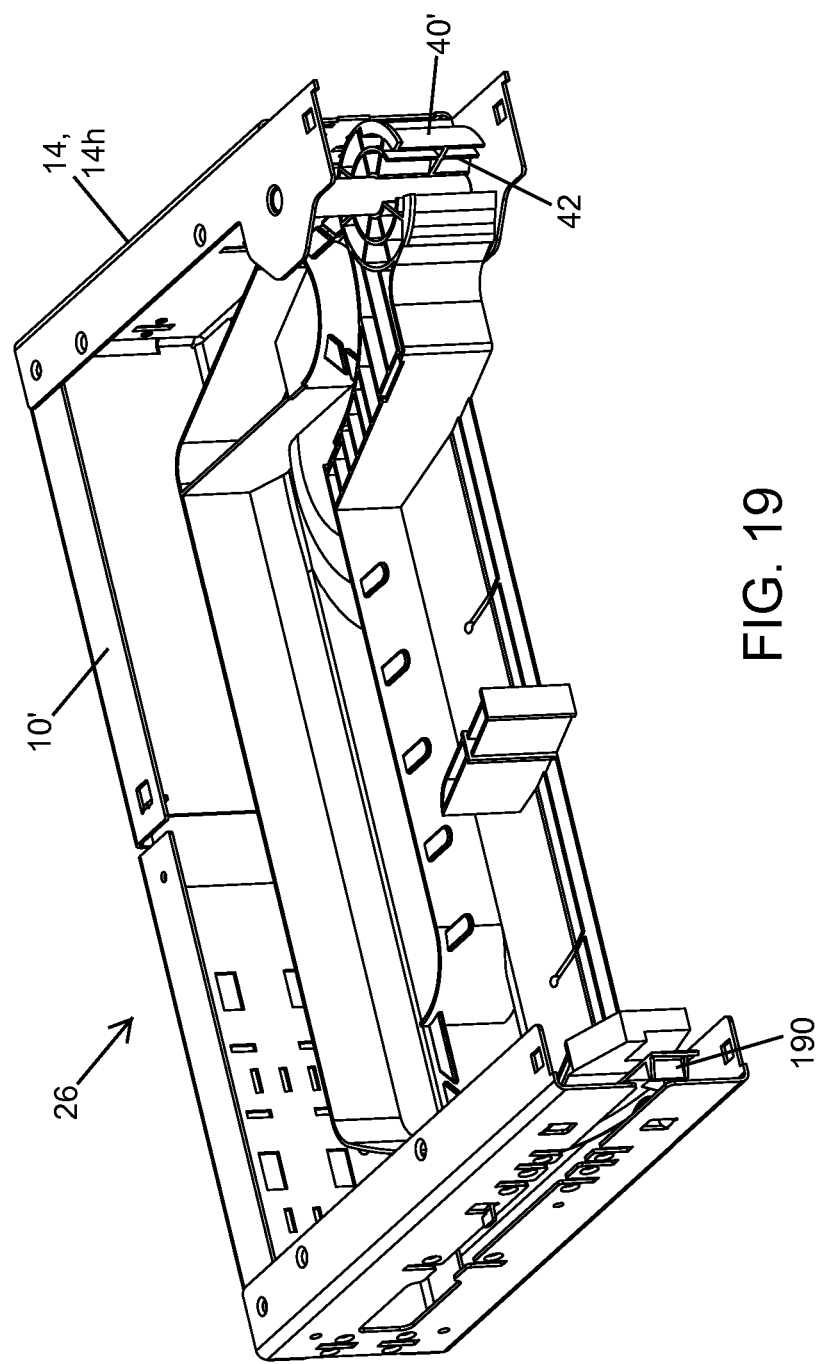
FIG. 19 is the perspective view of FIG. 18, but with the tray structure rotated into an interior of the chassis.
Figure 20:
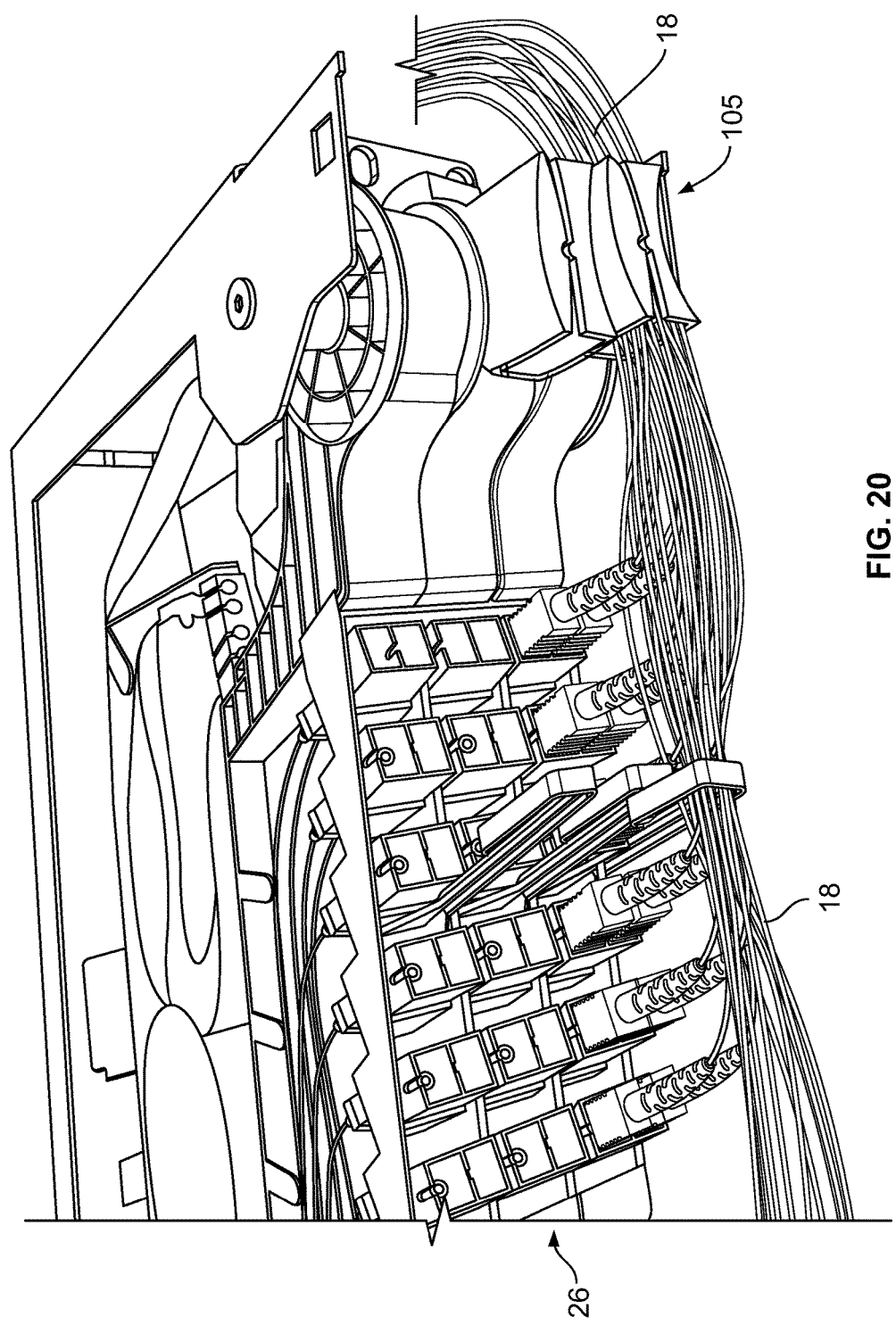
FIG. 20 is a partial perspective view of another telecommunications panel including rotatable cable guide members according to the principles of the present disclosure.

Turning now to FIGS. 17-19, an alternate embodiment of a sleeve 40' is illustrated according to the principles of the present disclosure. As with the sleeve 40, the sleeve 40' is attached to the tray 20 and rotatably mounts about the pin 30. In the depicted embodiments, the sleeve 40 and the sleeve 40' are one piece with a tray structure 24 of the tray 20. An access slot 42 (i.e., an access cut) is cut through a wall of the sleeve 40'. As depicted, the axis slot 42 is wedge shaped. As depicted, the wedge shape reaches a vertex at the axis A2. The wedge shape may be pressed over the pin 30, and the sleeve 40' may thereby be spread apart and allow the pin 30 to snap within the sleeve 40'.

At FIG. 17, the tray structure 24 is positioned with the axis slot 42 aligned with the pin 30. At FIG. 18, the tray structure 24 has been moved toward the pin 30 and the sleeve 40' has been snapped over the pin 30. The tray structure 24 is thereby mounted to the pin 30 and to the chassis 10'. Upon the mounting of the tray structure 24 to the chassis 10', the tray structure 24 and thereby the tray 20 may be rotated between the installed configuration 26 and the access configuration 28.

To keep the tray 20 at the installed configuration 26, a latch structure 190 may be included in the telecommunications panel 100. In particular, the depicted embodiment includes a latch at the tray structure 24 and a catch at the chassis 10, 10'.

By including the latch structure 190 and the sleeve 40' with the access slot 42, the tray structure 24, and thereby the tray 20, may be installed and removed from the telecommunications panel 100 without tools or at least without special tools. Additional trays 20 may thereby be added to the telecommunications panel 100 and installed trays 20 may thereby be removed from the telecommunications panel 100. By including an easily removable tray 20 in the telecommunications panel 100, assembly of the telecommunications panel 100 is simplified, and investing in additional trays 20 may be deferred until needed.

In certain embodiments, the guide member 105 may allow the tray 20 to open farther than a guide member that is fixed to a conventional tray. In particular, if the guide member is fixed to the conventional tray adjacent to a hinge of the conventional tray, the guide member may interfere with adjacent structure upon the conventional tray being opened. In contrast, the guide member 105 may rotate separately from the tray 20 and may stop rotating upon contact with adjacent structure (e.g., of the cabinet 200) while the tray 20 continues opening. The tray 20 may therefore open farther than the conventional tray, in certain embodiments.

In certain embodiments, the patch cables 18 may be constrained by adjacent structure (e.g., of the cabinet 200). As the guide member 105 may rotate separately from the tray 20, a constraint on the patch cables 18 is removed or at least relaxed. By removing or relaxing this constraint from the patch cables 18, sharp bending of the patch cables 18 can be avoided, even when the patch cables 18 are constrained by the adjacent structure (e.g., when the tray 20 is opened).

FIGS. 24-33 illustrate another example telecommunications arrangement including an enclosure 300 defining an access opening 303 for accessing an interior of the enclosure 300. A door 304 and guide members 305 are pivotally mounted to the enclosure 300 at the access opening 303. The door 304 pivots along a path of travel T to at least partially close the access opening 303 when in a closed position and to allow access to the enclosure interior through the access opening 303 when in an open position. The guide members 305 move with the door 304 relative to the enclosure 300 when the door 304 moves along a first portion of the path of travel T. However, the guide members 305 stop moving relative to the enclosure 300 at an intermediate position along the path of travel T. The door 304 is configured to move relative to the guide members 305 and the enclosure 300 as the door 304 moves along a second portion of the path of travel T.

A feature of the enclosure 300 is that the largest possible opening angle of the door 304 (defined by the path of travel T) is not limited by the largest possible opening angle of the guide members 305. If the guide members 305 were rigidly attached to the door 304, then the guide members 305 would need to move along the complete path of travel T to enable the door 304 to move along the complete path of travel T. Accordingly, any interference between the guide members 305 and the enclosure 300 (or cables routed about the enclosure) would interfere with movement of the door 304. By allowing the door 304 to move relative to the guide members 305, the path of travel T and, hence, the opening angle of the door 304 may be increased.

Figure 24:
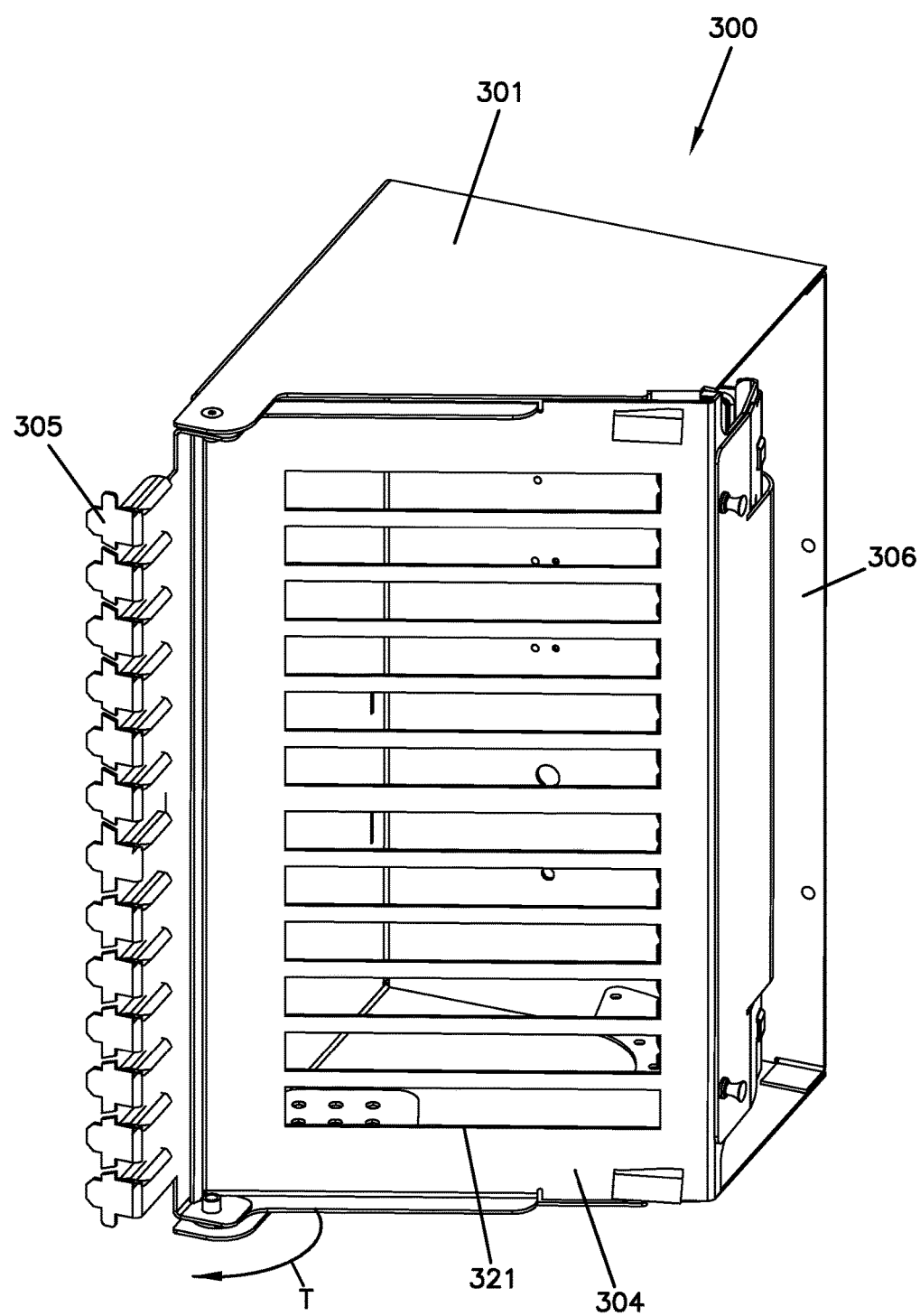
FIG. 24 is a front perspective view of an example enclosure including a door in a closed position relative to the enclosure.
Figure 25:
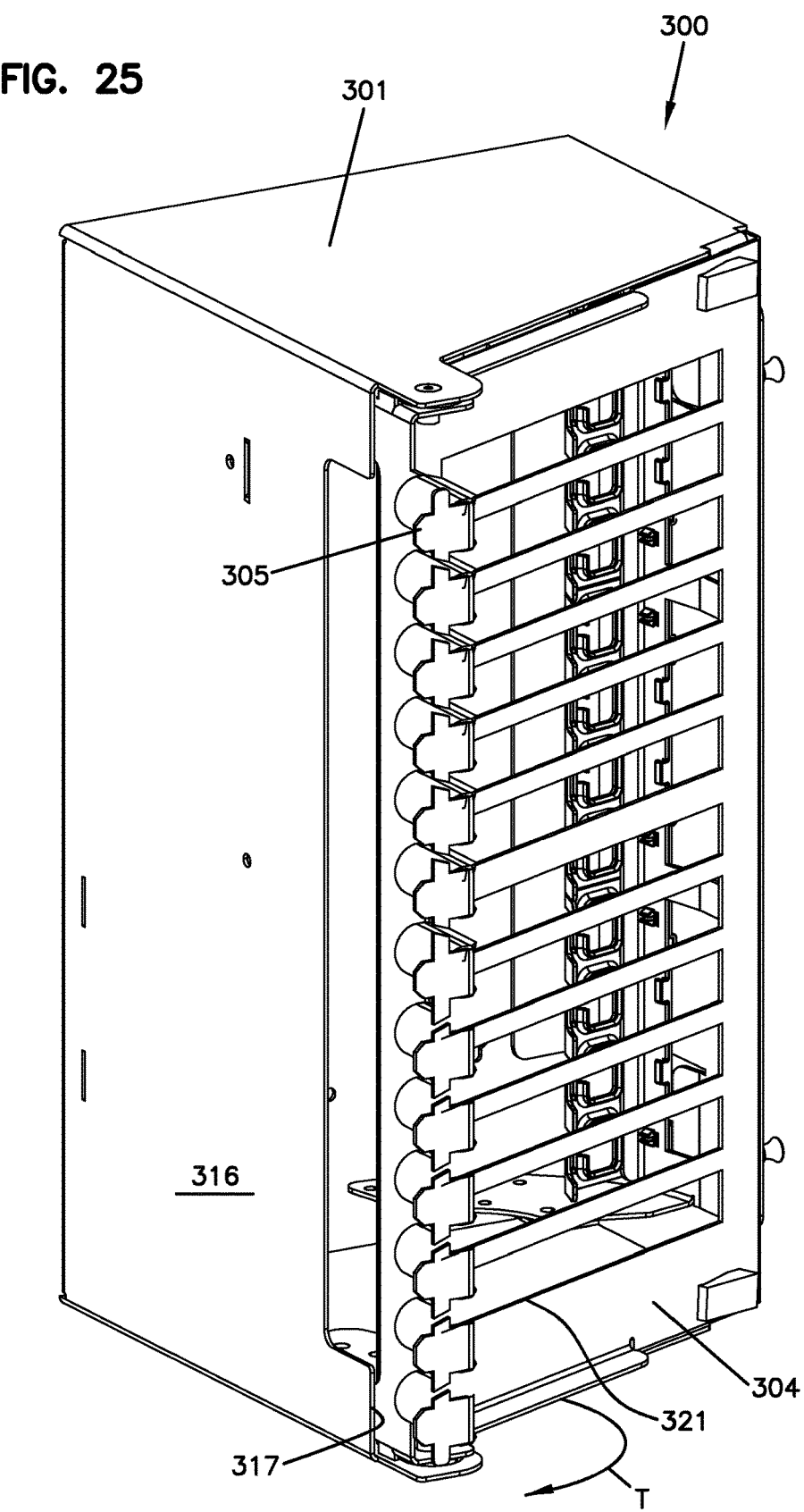
FIG. 25 is another perspective view of an example enclosure of FIG. 24.
Figure 26:
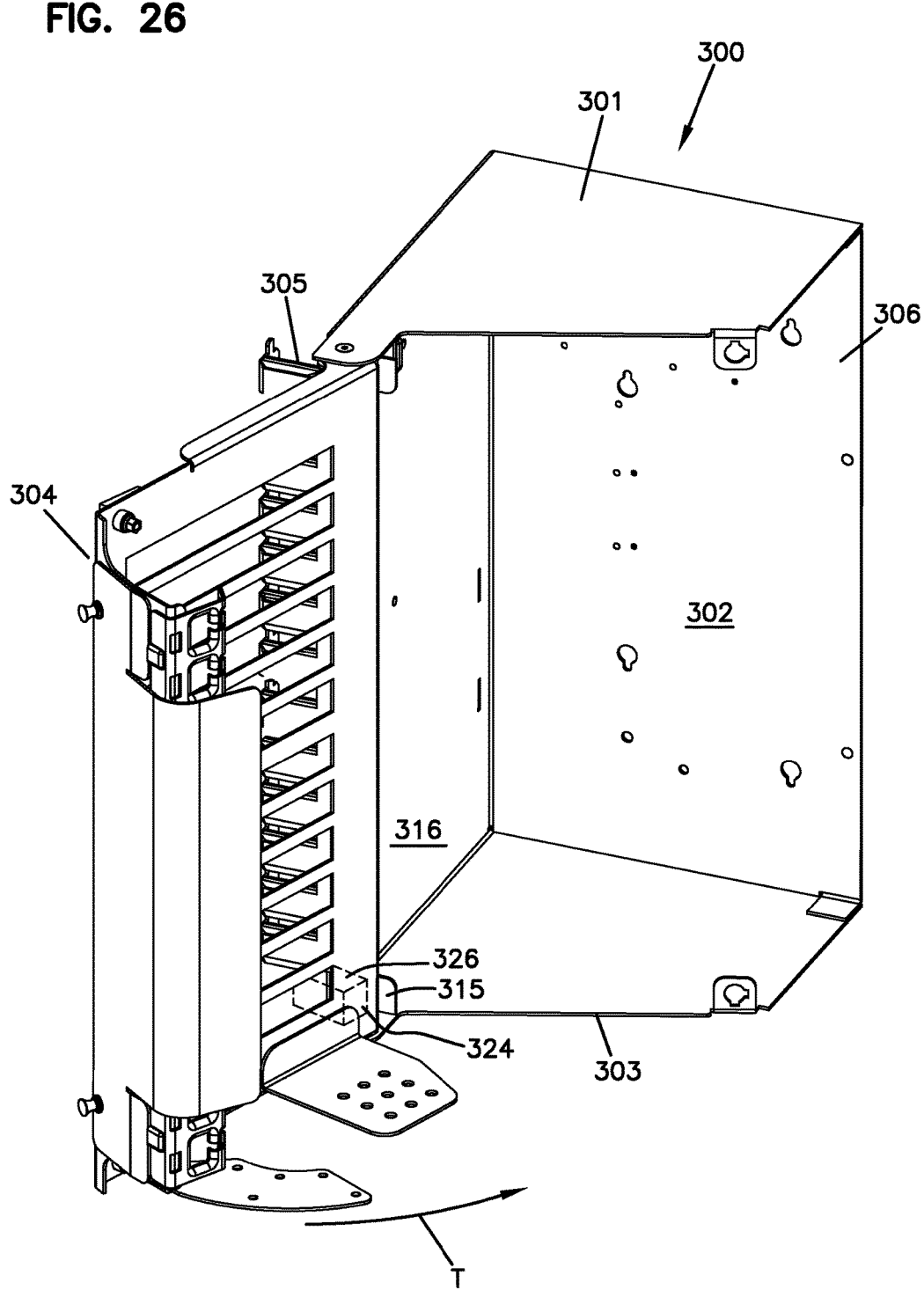
FIG. 26 is a perspective view of the enclosure of FIG. 24 with the door in an open position so that the interior of the enclosure is visible.

FIGS. 24 and 25 illustrate one example enclosure 300 including a body 301 defining an interior 302 accessible through an access opening 303. A door 304 is pivotally coupled to the enclosure 300 at the access opening 303. The door 304 is configured to pivot relative to the enclosure 300 between a closed position (see FIG. 24) and an open position (see FIG. 26). When in the closed position, the door 304 at least partially closes the access opening 303 to inhibit access to the enclosure interior 302. When in the open position, the door 304 enables access to the enclosure interior 302 through the access opening 303.

In some implementations, the door 304 is configured to receive telecommunications components to define a termination field 320. The termination field 320 has front ports 322 (FIG. 27) that face away from the enclosure interior 302 when the door is closed and rear ports 324 (FIG. 26) that face towards the enclosure interior 302 when the door is closed. For example, in certain implementations, the door 304 is configured to hold one or more optical adapters 326. The adapters 326 define the front and rear ports 322, 324. For example, the door 304 can define openings or elongated slots 321 (FIG. 24) in which the optical adapters can mount. SC type adapters is one example for adapters 326. In certain implementations, the door 304 is configured to hold value-added modules (VAMs) that include optical adapters. In other implementations, electrical jacks can be disposed on the door 304.

Telecommunications cables (e.g., optical cables, electrical cables, etc.) enter the enclosure interior 302 and are routed to the rear ports 324 of the termination field 320. For example, the enclosure 300 may define a second access opening 306 (e.g., at a top, bottom, or side of the enclosure 300) through which the cables can enter. In some implementations, additional telecommunications components (e.g., optical splitters, splice trays, wave division multiplexers, etc.) can be disposed within the enclosure interior 302 and connected to the rear ports 324. Additional telecommunications cables (e.g., patch cords) can plug into the front ports 322 of the termination field 320 to connect to the telecommunications cables and/or intermediate cables at the rear ports.

The additional telecommunications cables can be routed away from the enclosure 300 using guide members 305. For example, guide members 305 can be disposed adjacent the pivot axis P of the door 304. In some implementations, the guide members 305 extend forwardly of the door 304 to define slots through which the cables can be routed away from the door 304. In certain implementations, the guide members 305 include bend radius limiters that protect the cables against excessive bending as the cables are routed away from the door 304.

Additional details regarding example enclosures suitable for use with the disclosed door and guide members can be found in U.S. Pat. No. 6,760,531, the disclosure of which is hereby incorporated herein by reference.

In accordance with some aspects of the disclosure, the guide members 305 are configured to move with the door 304 at least part of the way as the door 304 is moved from the closed position to the open position. As the door 304 is moved towards the open position, the guide members 305 pivot away from the access opening 303. In certain implementations, the guide members 305 meet with interference (e.g., with the enclosure 300 or with cables routed about the enclosure 300) at an intermediate point along the path of travel T of the door 304 (see FIG. 29). When interference is met, the guide members 305 stop pivoting relative to the enclosure body 301. However, the door 304 can continue to move along the path of travel T to the open position.

Figure 28:
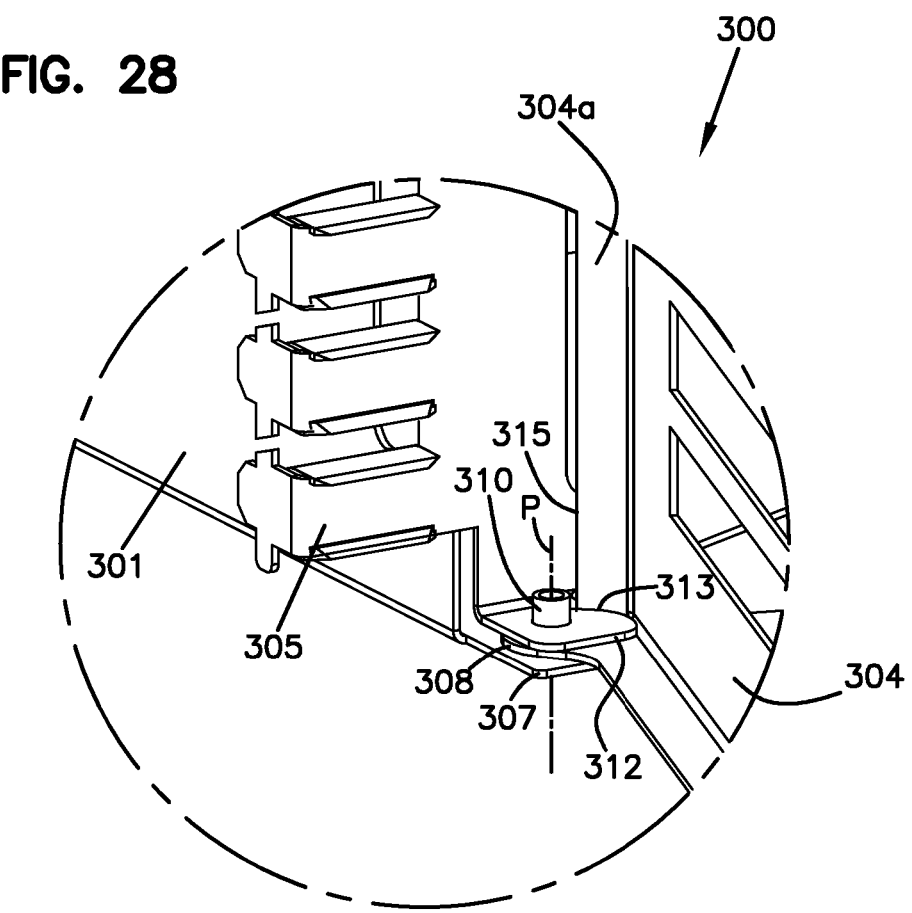
FIG. 28 is a perspective view of enlarged portions of the enclosure and door of FIG. 27.
Figure 29:
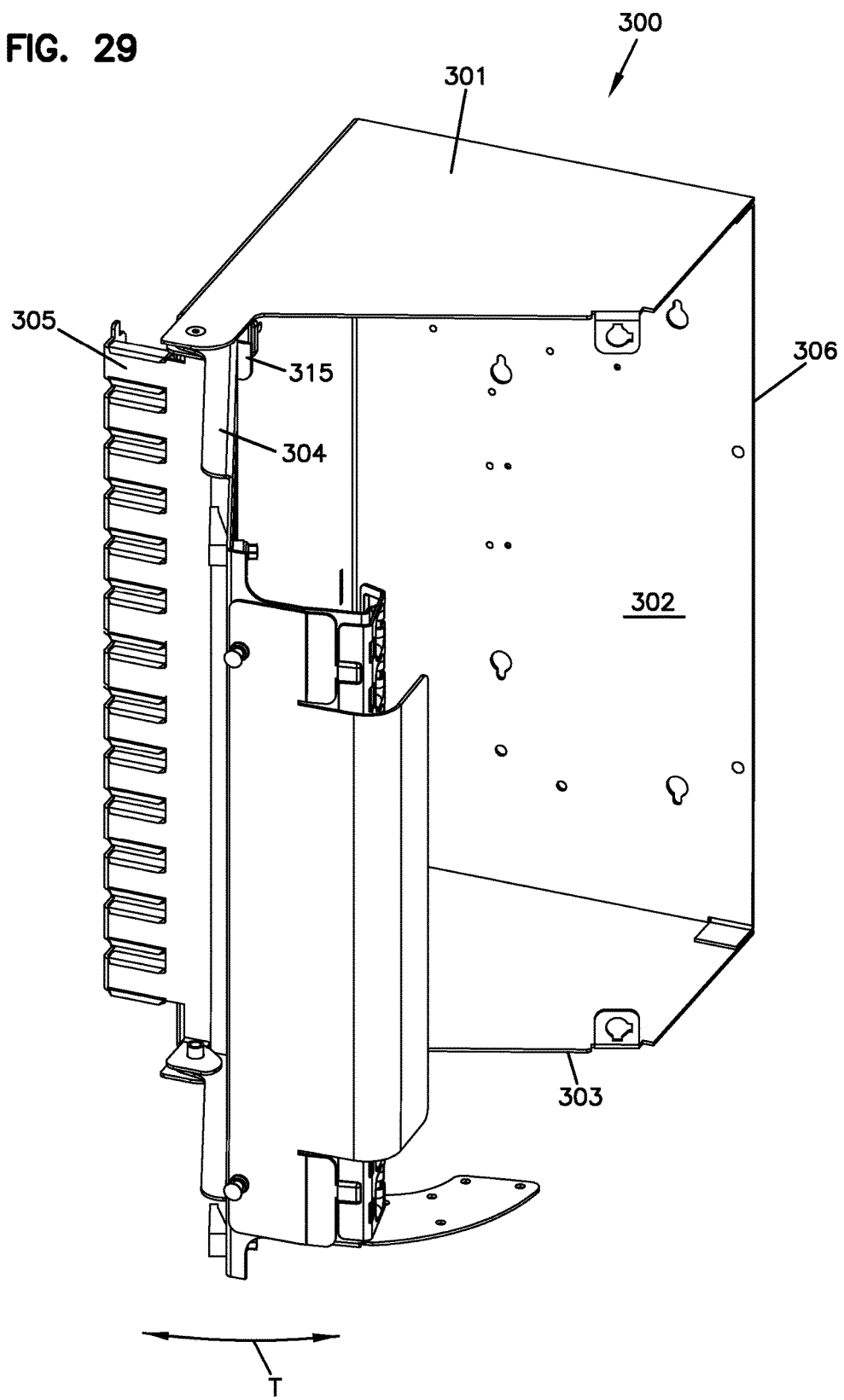
FIG. 29 is a another perspective view of the enclosure of FIG. 24 with the door in an intermediate position relative to the enclosure.
Figure 30:
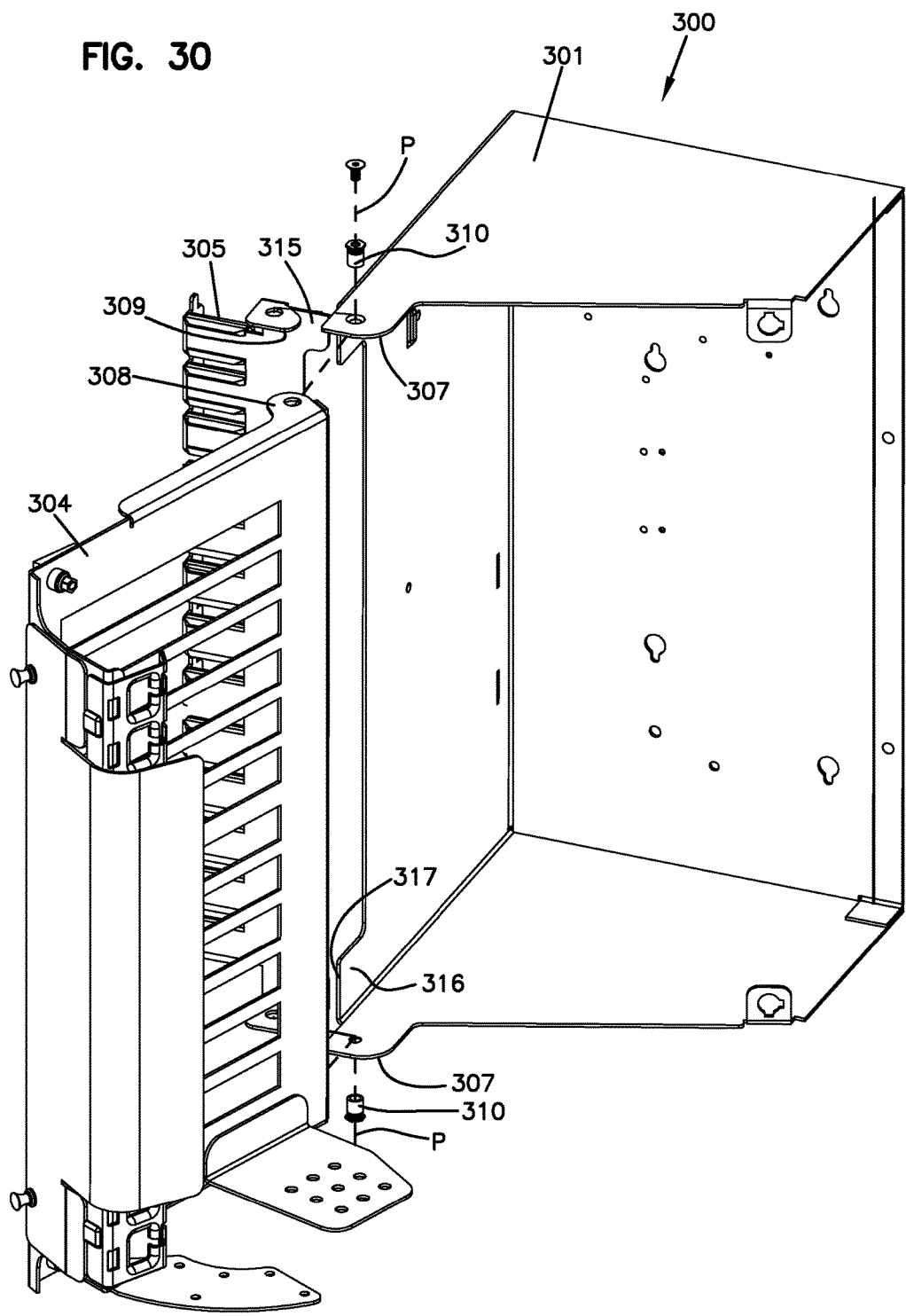
FIGS. 30 and 31 are perspective views of the enclosure of FIG. 26 with components including the door and guide members exploded away from the enclosure.
Figure 31:
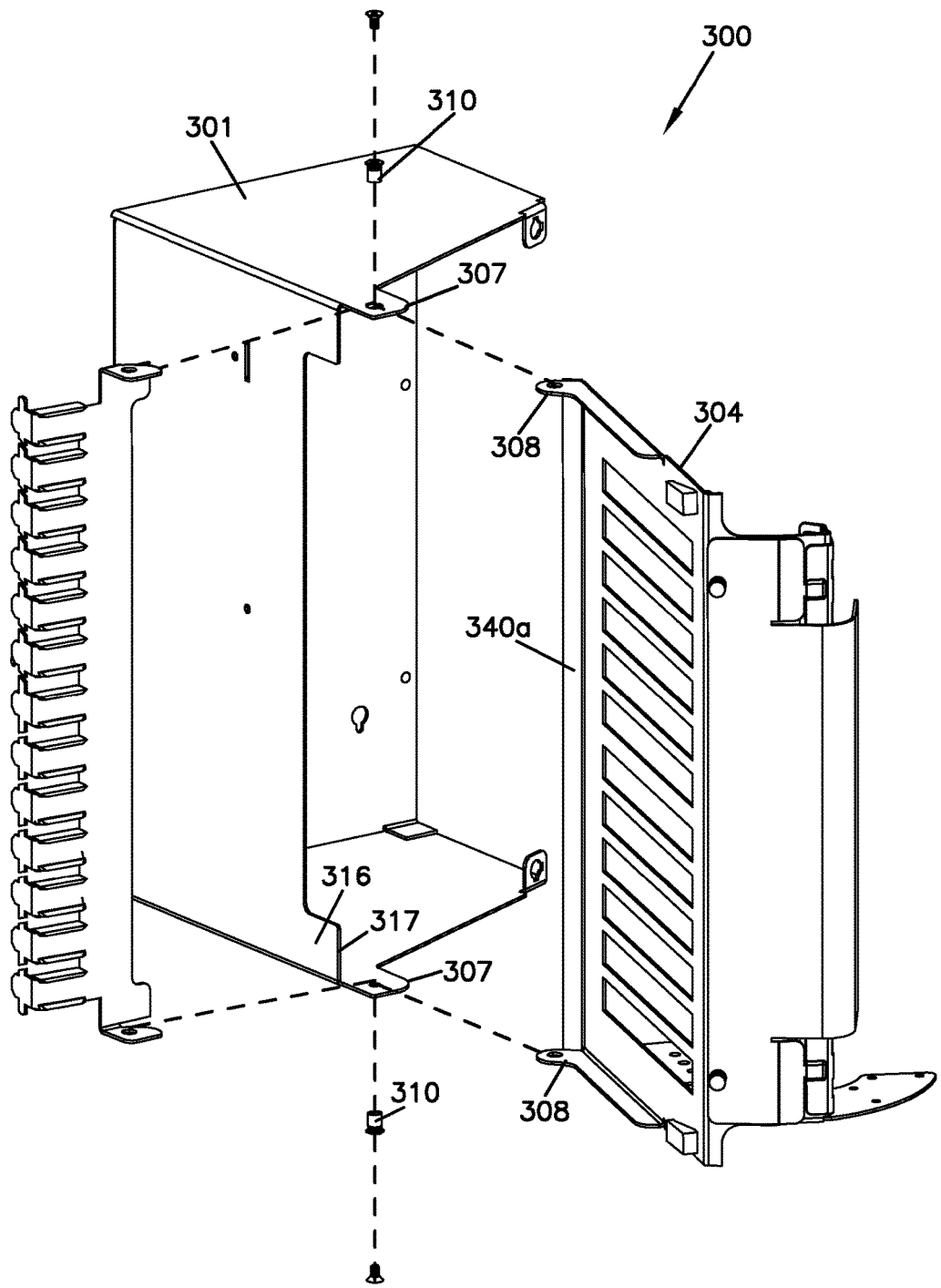

In some implementations, the guide members 305 are configured to pivot about the same pivot axis P as the door 304 (see FIG. 28). For example, the enclosure body 301 includes at least one hinge base 307 that supports a hinge pin 310 adjacent the access opening 303. The hinge pin 310 defines the pivot axis P. The door 304 includes at least one hinge flange 308 that rotatably engages the hinge pin 310 so that the door 304 pivots about the pivot axis P. The guide members 305 also include a hinge flange 309 that rotatably engages the hinge pin 310 so that the guides 305 pivot about the pivot axis P. The hinge flange 309 of the guide members 305 is separate from the hinge flange 308 of the door 304. Accordingly, the hinge flanges 308, 309 can be moved separately.

In certain implementations, the enclosure body 301 includes two hinge bases 307 holding hinge pins 310 at the top and bottom of the enclosure body 301 aligned along the pivot axis P. In such implementations, the door 304 and guides 305 include upper and lower hinge flanges 308, 309 that rotatably engage the support pins 310 at the hinge bases 307. The upper and lower hinge flanges 308, 309 provide stability to the door 304 and guides 305 during rotation. In certain implementations, the door hinge flanges 308 are disposed between the guide member hinge flanges 309 and the hinge bases 307. In other implementations, however, the guide member hinge flanges 309 can be positioned between the door hinge flanges 308 and the hinge bases 307 or at opposite sides of the hinge bases 307 from the door hinge flanges 308.

Figure 27:
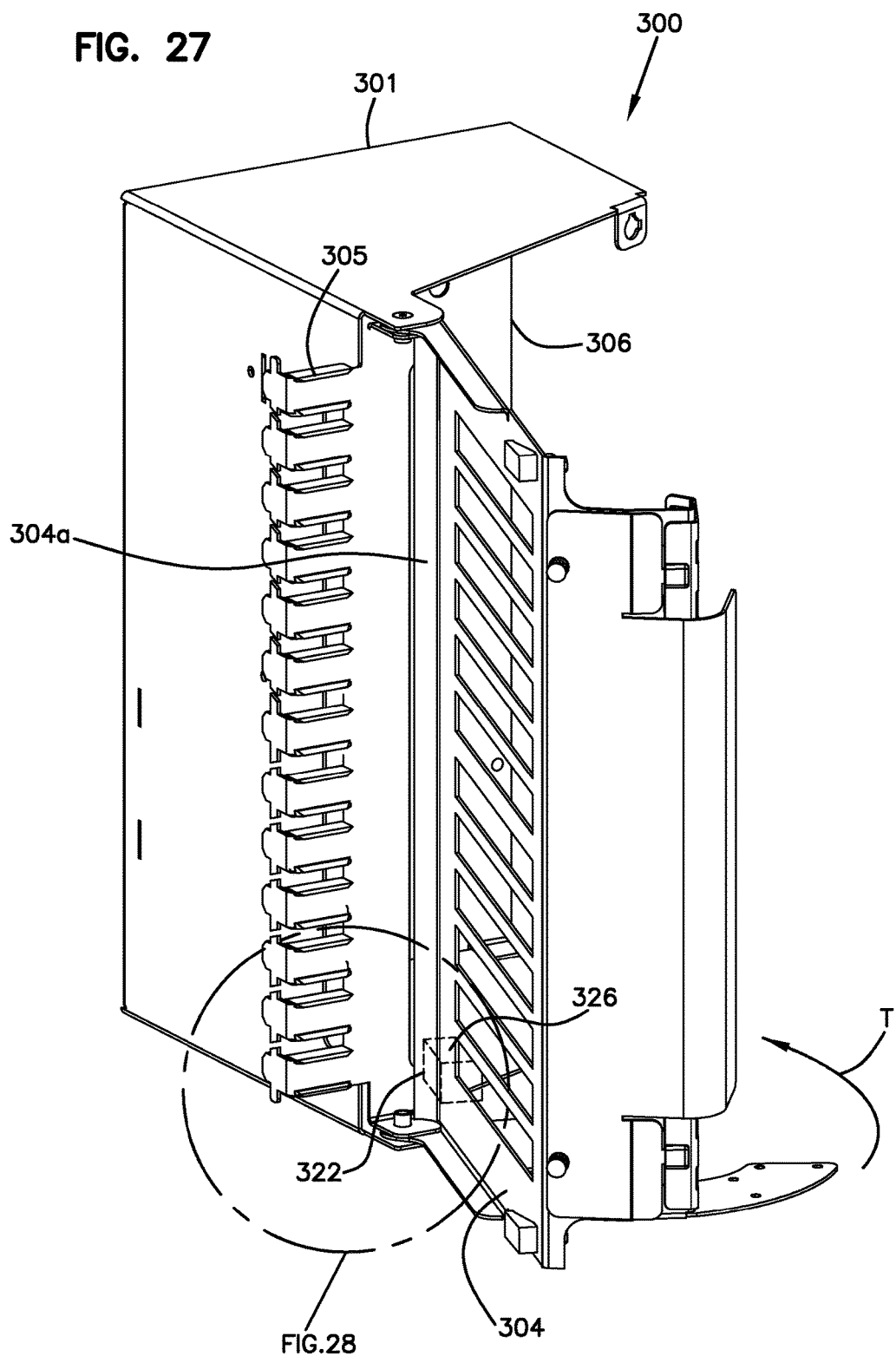
FIG. 27 is another perspective view of the enclosure of FIG. 26 rotated so that guide members are visible.

In some implementations, the pivot axis P is disposed within the enclosure interior 302. In other implementations, however, the pivot axis P is disposed outside of the enclosure interior 302. For example, as shown in FIGS. 24 and 27, the pivot axis P is disposed in front and to one side of the door 304. The hinge bases 307 of the enclosure body 301 extend forwardly of the door 304. The door hinge flanges 308 also extend outwardly in front of the door 304 when the door 304 is closed. In the example shown, the guide member hinge flange 309 extends laterally outwardly from the guide members 305 in front of the door 304. Disposing the pivot axis P outside of the enclosure 300 increases the available length of the path of travel T for the door 304.

As the door 304 and guide members 305 move from the closed position to the open position, the door hinge flanges 308 and the guide member hinge flanges 309 rotate in unison about the hinge pin 310. When the guide members 305 reach the intermediate position along the path of travel T, however, the door hinge flange 308 begins to rotate relative to the guide member hinge flange 309. As shown in FIG. 28, the guide member hinge flange 309 is shaped (e.g., defines a contoured surface 312) to enable the door 304 to slide or cam around the flange 309 as the door 304 moves relative to the guide member hinge flange 309.

The hinge flange 309 of the guide members 305 includes an abutment surface 313 that is configured to engage part 304a (see FIGS. 28 and 29) of the door 304 when the door 304 is pivoted towards the open position. For example, the door 304 may include a vertically extending flange 304 that protrudes forwardly of the door 304 when the door 304 is in the closed position. When the door 304 is moved from the closed position towards the open position, the door flange 304a engages the abutment surface 313 of the guide member hinge flange 309, thereby entraining the guide members 305 to pivot with the door 304. When the guide members 305 reach the intermediate position along the path of travel T, further movement of the door 304 causes the door 304 to cam or slide around the contoured surface 312, thereby moving the door flange 304a out of engagement with the abutment surface 313.

The guide members 305 include a tab 315 (FIG. 28) that extends between the door 304 and the enclosure body 301 adjacent the pivot axis P. The tab 315 moves rigidly with the guide members 305. When the door 304 moves from the intermediate position to the open position, the door 304 moves away from the tab 315. When the door 304 returns to the intermediate position, however, the door 304 engages the tab 315. As the door 304 continues to move from the intermediate position towards the closed position, the door 304 entrains (or applies a torque to) the tab 315 to pull the guide members 305 with the door 304 back to the closed position. Accordingly, the guide members 305 pivot in unison with the door 304 when the door 304 moves along the path of travel T from the intermediate position to the closed position.

In one embodiment, guide members 305 rotate only between a closed position when tabs 315 engage the inside of wall surface 316 and an open position when guide members 305 engage cables or edge 317 of wall surface 316. Compare FIG. 24 and FIG. 29. Door 304 can rotate further due to the second independent hinge which allows additional opening. Compare FIG. 24 and FIG. 27. Engagement of door flange 304a and guide member hinge flange 309 limits the amount of opening of door 304. See FIG. 28.

Figure 32:
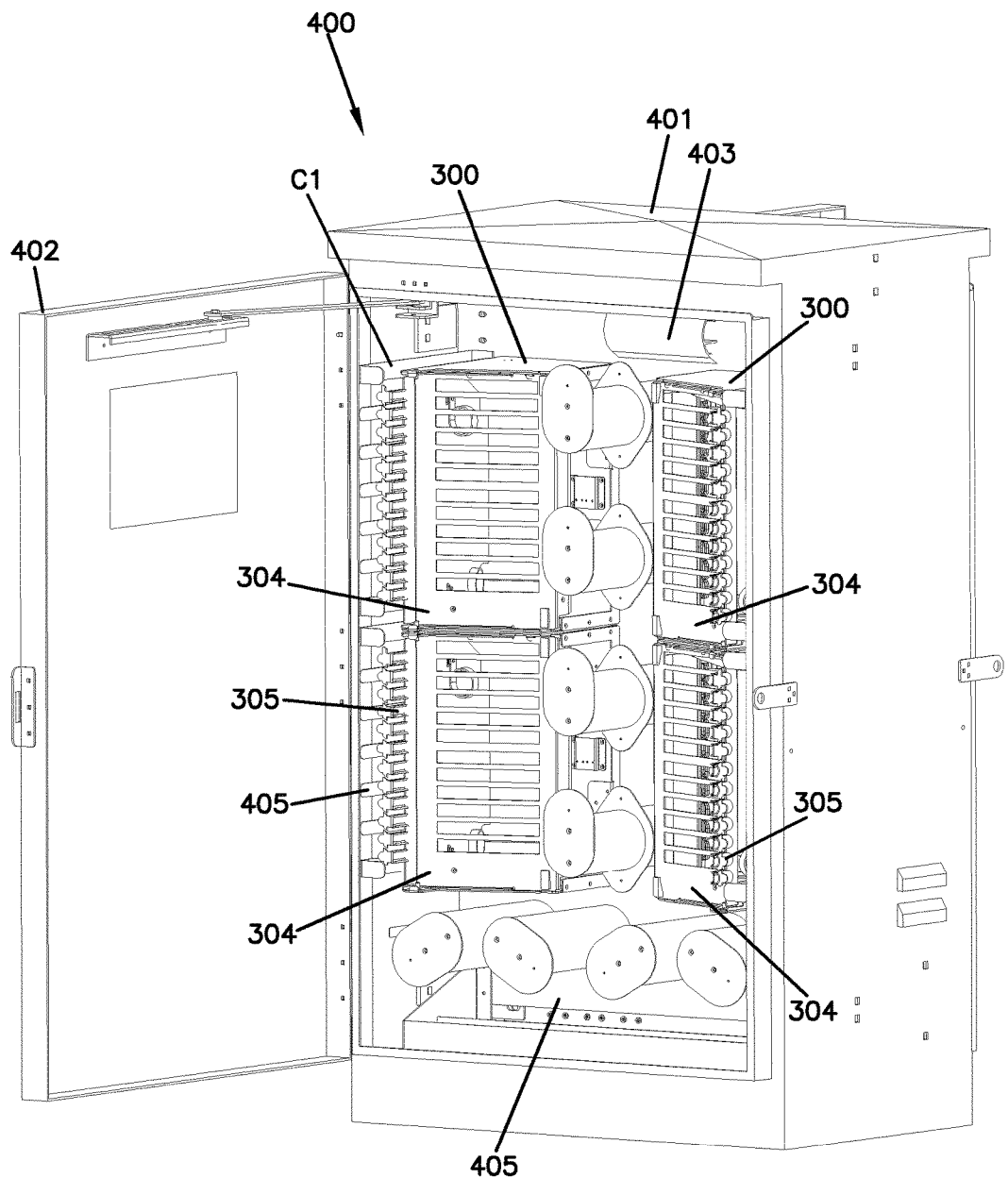
FIG. 32 is a perspective view of an example cabinet system configured to hold one or more of the enclosures of FIGS. 24-31.
Figure 33:
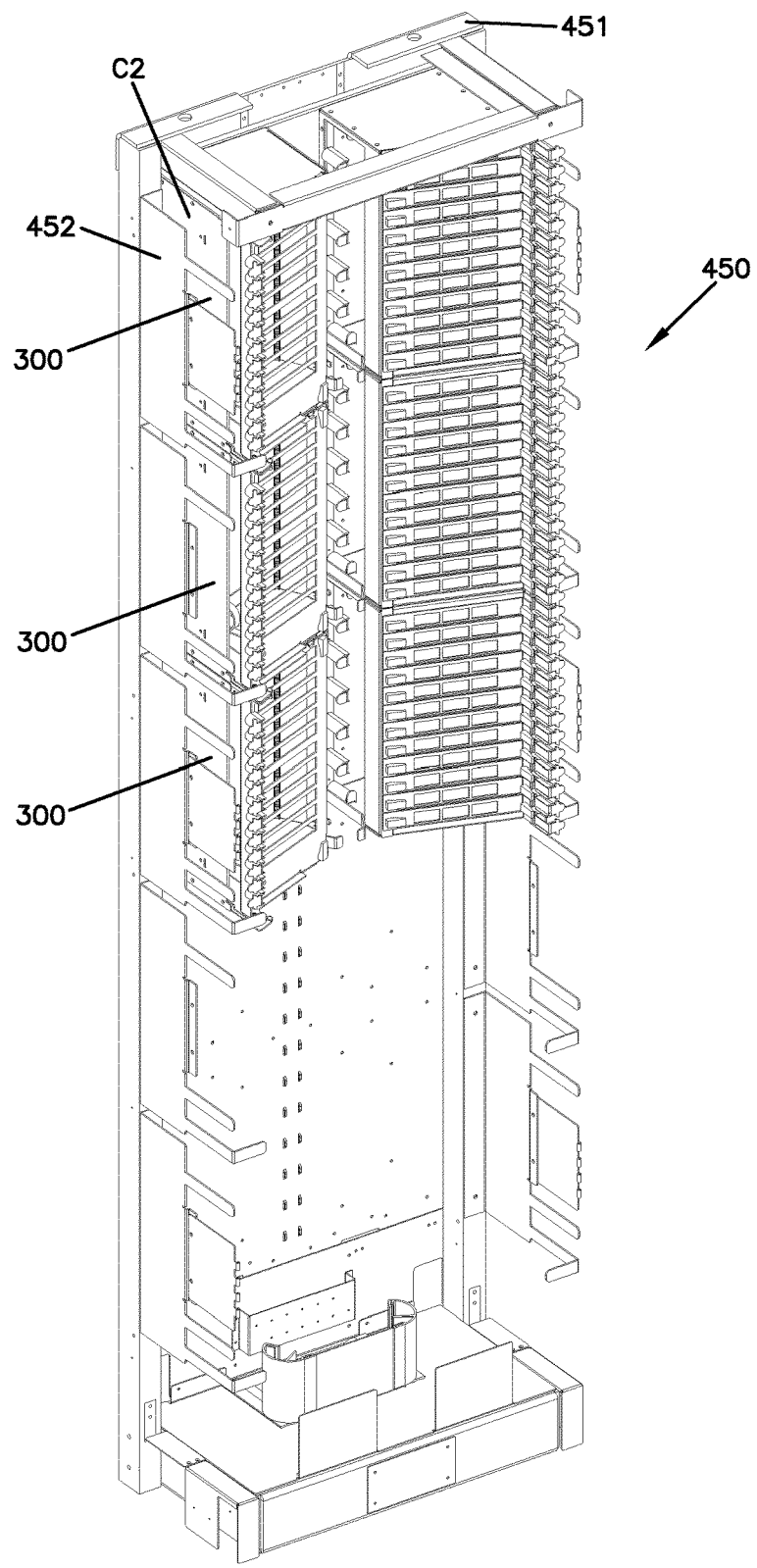
FIG. 33 is a perspective view of an example rack system configured to hold one or more of the enclosures of FIGS. 24-31.

FIGS. 32 and 33 illustrate example systems in which the enclosure 300 disclosed above can be utilized. FIG. 32 illustrates a cabinet 400 (e.g., a fiber distribution hub) that is configured to hold one or more enclosures 300. In the example shown, the cabinet 400 includes a housing 401 and at least one door 402 that covers an opening leading to the interior 403 of the housing 401. In some implementations, cables (e.g., subscriber distribution cables) enter the housing interior 403 and are routed into the enclosures 300 and to the rear ports 324 of the termination fields 320. Additional cables (e.g., feeder cables) also enter the housing interior 403 and are routed to the front ports 322 of the termination fields 320 to connect subscribers to the network. The rear ports 324 can be accessed (e.g., for cleaning, for adding/removing/changing connections, etc.) by opening the enclosure door 304.

Cable management structures 405 (e.g., storage spools, bend radius limiters, retaining fingers, etc.) are disposed within the cabinet interior 403 to guide cables within the cabinet 400. Some of the cable management structures 405 cooperate with the enclosures 300 to define routing channels C1 along sides of the cabinet interior 403. Cables can be routed through the channels C1 (e.g., to store slack length) between various components within the cabinet 400. When the enclosure doors 304 are opened, the guide members 305 of the enclosures 300 may impinge upon the cables within the channels C1. In conventional systems, rigidly attached guide members would limit the opening angle of the enclosure doors when they hit the cables in the channels C1 (or the management structures or the side of the cabinet). Advantageously, the enclosure doors 404 of the above-described enclosure 300 can continue to open after the guide members 305 (i.e., have a larger opening angle) are stopped by these cables.

FIG. 33 illustrates a rack 450 (e.g., an inside-plant frame) that is configured to hold one or more enclosures 300. In the example shown, the rack 450 includes a frame 451 to which the enclosures 300 can be mounted. Incoming and outgoing cables enter the frame 451, route around cable management structures 452 (e.g., storage spools, bend radius limiters, retaining fingers, etc.), and connect together at the termination fields 320 of the enclosures 300. In certain implementations, the incoming and outgoing cables can be routed to rear ports 324 of the termination fields 320 and patch cords can be routed between front ports 322 of the termination fields 320 to connect the incoming and outgoing cables. The enclosure rear ports 324 can be accessed (e.g., for cleaning, for adding/removing/changing connections, etc.) by opening the enclosure doors 304.

As shown, some of the cable management structures 452 cooperate with the enclosures 300 to define routing channels C2 along sides of the cabinet interior 403. Cables can be routed through the channels C1 (e.g., to store slack length) between various equipment within the rack 450. When the enclosure doors 304 are opened, the guide members 305 of the enclosures 300 may impinge upon the cables within the channels C2 (or the management structures). In conventional systems, rigidly attached guide members would limit the opening angle of the enclosure doors when they hit the cables in the channels C2. Advantageously, the enclosure doors 304 of the above-described enclosure 300 can continue to open after the guide members 305 (i.e., have a larger opening angle) are stopped by these cables.

While this invention has been particularly shown and described with references to preferred embodiments thereof, it will be understood by those skilled in the art that various changes in form and details may be made therein without departing from the scope of the invention encompassed by the appended claims. The drawings are not necessarily to scale, emphasis instead being placed upon illustrating the principles of the invention and other modifications within the scope. Any such modifications or variations that fall within the purview of this description are intended to be included therein as well. It is understood that the description herein is intended to be illustrative only and is not intended to be limitative.

LIST OF REFERENCE NUMERALS AND CORRESPONDING FEATURES

A2 axis
A4 axis
10 chassis
10' chassis
12 base
14 sides
14h hinge side
16 top
17 mounting tab
18 patch cord
20 tray
22 upright wall
24 tray structure
26 installed configuration
28 access configuration
30 pin
40 sleeve
40' sleeve
42 access slot
50 hinge
100 telecommunications panel
102 interior
105 guide member
110 guide member
115 guide member
120 termination field
126 fiber optic adapter
150 guide member body
152 first side
154 second side
156 inner wall
158 outer wall
160 cable passage
162 cable insertion slot
164 keeper
170 hinge portion
172 pin hole
180 mount
182 arms
184 pin stub
190 latch structure
200 cabinet
205 cable management structure
300 enclosure
301 enclosure body
302 enclosure interior
303 access opening
304 door
305 guide members
306 second access opening
307 hinge base
308 door hinge flange
309 guide member hinge flange
310 pivot pin
312 contoured surface
315 tab
316 wall surface
317 edge
320 termination field
322 front ports
324 rear ports
326 adapter
P pivot axis
T path of travel
400 cabinet
401 housing
402 door
403 interior
405 cable management structures
C1 cable channel
450 rack
451 frame
452 cable management structures
C2 cable channel

What is claimed is:

1. An enclosure comprising:
    an enclosure body defining an access opening for accessing an interior of the enclosure body;
    a door pivotally mounted to the enclosure body at the access opening, the door being configured to pivot along a path of travel to at least partially close the access opening when in a closed position and to allow access to the enclosure interior through the access opening when in an open position; and
    guide members pivotally mounted to the enclosure body at the access opening, the guide members being configured to pivot with the door relative to the enclosure body about a common pivot axis when the door moves along a first portion of the path of travel and the guide members being configured to stop relative to the enclosure body at an intermediate position along the path of travel;
    wherein the door is configured to move relative to the guide members and the enclosure body as the door pivots along a second portion of the path of travel.

2. The enclosure of claim 1, wherein the guide members extend forwardly of the door to define slots through which cables can be routed away from the enclosure body.

3. The enclosure of claim 1, wherein the pivot axis is disposed outside of the enclosure interior.

4. A method of accessing an interior of an enclosure through an access opening, the method comprising:
pivoting an enclosure door relative to the enclosure along a first portion of a path of travel in a first direction;
entraining guide members to pivot in unison with the enclosure door along the first portion of the path of travel in the first direction; and
pivoting the enclosure door along a second portion of the path of travel in the first direction, the enclosure door pivoting relative to the guide members and relative to the enclosure, the enclosure door and guide members pivoting about a common axis.

5. The method of claim 4, further comprising:
pivoting the enclosure door relative to the enclosure and relative to the guide members along the second portion of the path of travel in a second direction until the enclosure door engages the guide members; and
pivoting the enclosure door along the first portion of the path of travel in the second direction; and
entraining the guide members to pivot in unison with the enclosure door along the first portion of the path of travel in the second direction.

6. The method of claim 5, wherein entraining guide members to pivot in unison with the enclosure door in the first direction comprises engaging a door flange with an abutment surface of the guide members.

7. The method of claim 6, wherein entraining guide members to pivot in unison with the enclosure door in the second direction comprises engaging a tab of the guide members with the door flange.

8. A telecommunications panel comprising:
a chassis;
a tray rotatably mounted to the chassis by a hinge, wherein the hinge rotates about a first axis, the tray being rotatable into and out of the chassis; and
a guide member rotatable with respect to the chassis and tray, the guide member defining a channel and being adapted to provide bend radius protection to cables routed to the telecommunications panel, wherein the guide member rotates about a second axis-that is spaced from the first axis, wherein the guide member is configured to be rotated by the cables.

9. The telecommunications panel of claim 8, wherein the guide member compensates for route length reduction of a route of the cables when the tray is moved from an installed configuration to an access configuration.

10. The telecommunications panel of claim 8, wherein the guide member channel includes a cable insertion slot.

11. The telecommunications panel of claim 8, wherein the guide member at least partially covers the hinge when the guide member is rotated to a closed position.

12. The telecommunications panel of claim 8, wherein the guide member is mounted to the chassis.

13. The telecommunications panel of claim 8, wherein the chassis includes a termination field supporting a plurality of fiber optic adapters.

14. The telecommunications panel of claim 8, wherein the guide member is rotatable about a mounting pin.

15. The telecommunications panel of claim 8, wherein the tray includes a plurality of vertically stacked trays, each of which being provided with the guide member.

* * * * *